United States Patent
Yeo

(10) Patent No.: US 10,162,219 B2
(45) Date of Patent: Dec. 25, 2018

(54) DISPLAY DEVICE

(71) Applicant: LG ELECTRONICS INC., Seoul (KR)

(72) Inventor: Simdong Yeo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/417,832

(22) Filed: Jan. 27, 2017

(65) Prior Publication Data

US 2017/0219884 A1   Aug. 3, 2017

(30) Foreign Application Priority Data

Feb. 1, 2016   (KR) .................. 10-2016-0012208

(51) Int. Cl.
*G02F 1/1335*   (2006.01)

(52) U.S. Cl.
CPC .. *G02F 1/133608* (2013.01); *G02F 1/133605* (2013.01); *G02F 1/133611* (2013.01); *G02F 1/133603* (2013.01)

(58) Field of Classification Search
CPC ......... G02F 1/133605; G02F 1/133606; G02F 1/133608; G02F 1/133611; G09F 13/14
See application file for complete search history.

(56) References Cited

U.S. PATENT DOCUMENTS

| | | | |
|---|---|---|---|
| 2006/0221612 A1 | 10/2006 | Song et al. | |
| 2008/0211989 A1* | 9/2008 | Park | G02F 1/133603 349/64 |
| 2011/0063850 A1* | 3/2011 | Oide | G02F 1/133603 362/296.01 |
| 2011/0109814 A1* | 5/2011 | Takemura | G02F 1/133605 348/790 |

(Continued)

FOREIGN PATENT DOCUMENTS

| | | |
|---|---|---|
| CN | 203643721 | 6/2014 |
| JP | 2010-251122 | 11/2010 |
| WO | WO 2013/038802 | 3/2013 |

OTHER PUBLICATIONS

European Search Report dated Apr. 19, 2017 issued in Application No. 17153968.7.
European Search Report dated Aug. 10, 2017 issued in Application No. 17153968.7.

*Primary Examiner* — Alexander Garlen
(74) *Attorney, Agent, or Firm* — KED & Associates, LLP

(57) ABSTRACT

Provided is a backlight unit and a display device including the backlight unit. A backlight unit may include a frame, at least one substrate, a plurality of light sources installed over the at least one substrate, a reflecting sheet, and an optical sheet. The reflecting sheet may include a first sheet region, a second sheet region that extends outward from the first sheet region and inclined relative to the first sheet region, and a third sheet region provided in the first sheet region and having a protrusion that protrudes from the first sheet region toward a front side of the backlight unit. The reflecting sheet (Continued)

may include a plurality of patterns provided on the second sheet region and the third sheet region configured to reduce reflectivity of light emitted from the plurality of light sources. The plurality of patterns may be formed by dots arranged to form the pattern.

18 Claims, 39 Drawing Sheets

(56) References Cited

U.S. PATENT DOCUMENTS

| | | | |
|---|---|---|---|
| 2011/0241056 A1* | 10/2011 | David | H01L 33/20 257/98 |
| 2012/0069248 A1* | 3/2012 | Yokota | G02F 1/133605 348/739 |
| 2012/0287347 A1* | 11/2012 | Matsumoto | G02F 1/133603 348/725 |
| 2013/0070170 A1 | 3/2013 | Namekata | |
| 2013/0148036 A1* | 6/2013 | Shimizu | H04N 5/64 348/739 |
| 2013/0222705 A1 | 8/2013 | Shimizu et al. | |
| 2014/0211121 A1* | 7/2014 | Cho | G02F 1/133603 349/58 |
| 2015/0146436 A1* | 5/2015 | Heo | F21V 7/09 362/346 |
| 2016/0252775 A1* | 9/2016 | Lu | G02F 1/133605 362/97.1 |

* cited by examiner

FIG. 7
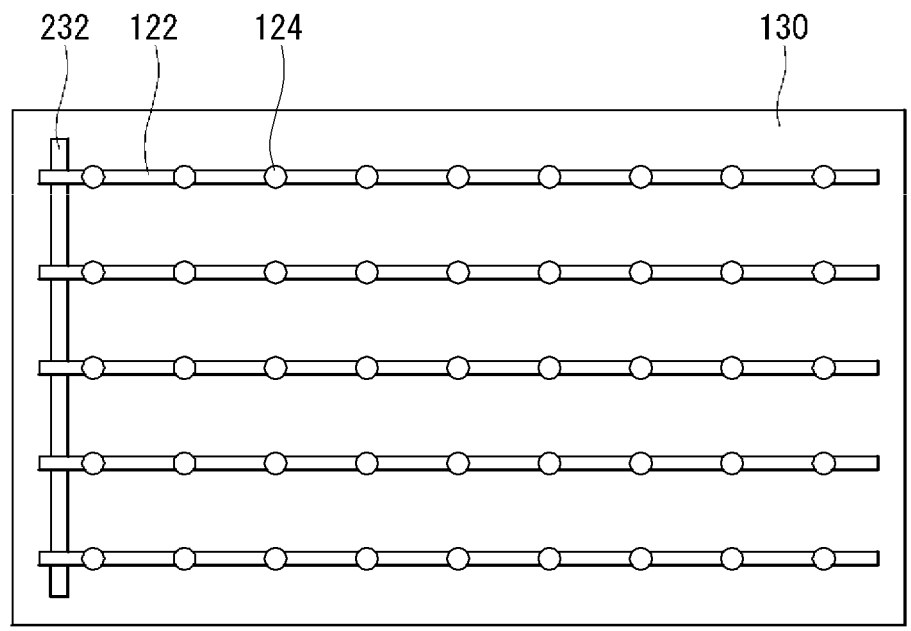
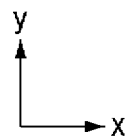
FIG. 8
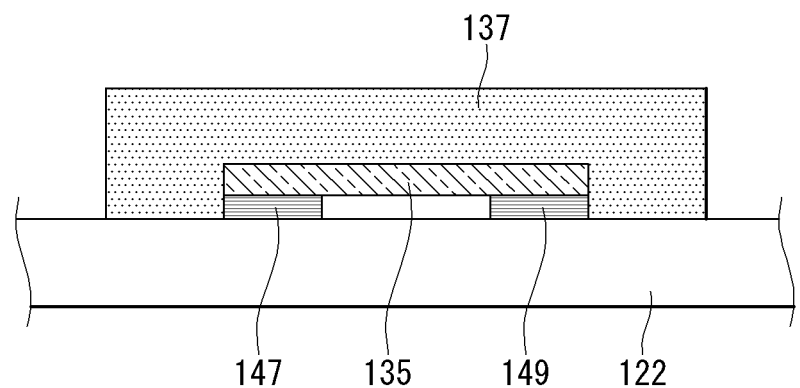

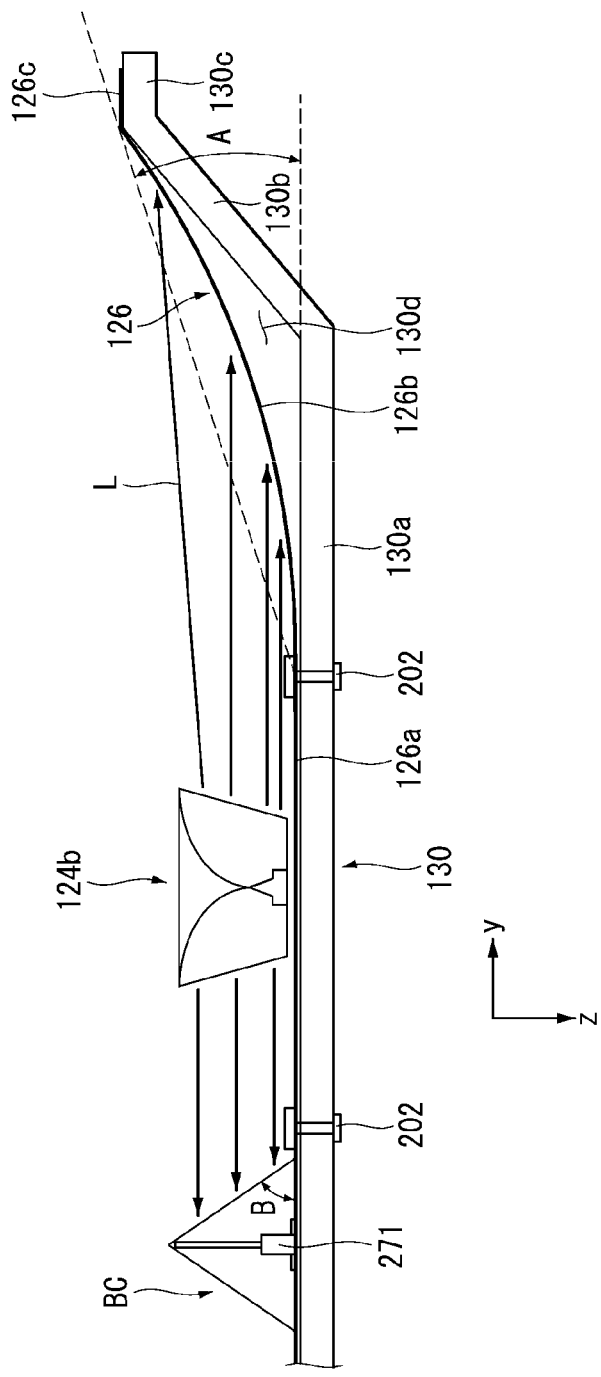

DISPLAY DEVICE

CROSS-REFERENCE TO RELATED APPLICATION(S)

This application claims the benefit of Korean Patent Application No. 10-2016-0012208 filed on Feb. 1, 2016, the entire contents of which are incorporated herein by reference for all purposes as if fully set forth herein.

BACKGROUND

1. Field

Provided is a backlight unit and a display device including the backlight unit.

2. Background

With the development of the information society, various demands for display devices have been increasing. Various display devices, such as, e.g., liquid crystal displays (LCDs), plasma display panels (PDPs), electroluminescent displays (ELDs), and vacuum fluorescent displays (VFDs), have been studied and used to meet various demands for the display devices.

Among the display devices, a liquid crystal display panel of the liquid crystal display includes a liquid crystal layer, and a thin film transistor (TFT) substrate and a color filter substrate which are positioned opposite each other with the liquid crystal layer interposed therebetween. The liquid crystal display panel displays an image using light provided by a backlight unit of the liquid crystal display.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIGS. 3 to 7 illustrate a structure of a display device according to the present disclosure;

FIGS. 8 and 9 illustrate a light source according to one embodiment of the present disclosure;

FIGS. 23 to 25 illustrate a structure of a reflecting sheet according to another embodiment of the present disclosure;

DETAILED DESCRIPTION

Figure 1:
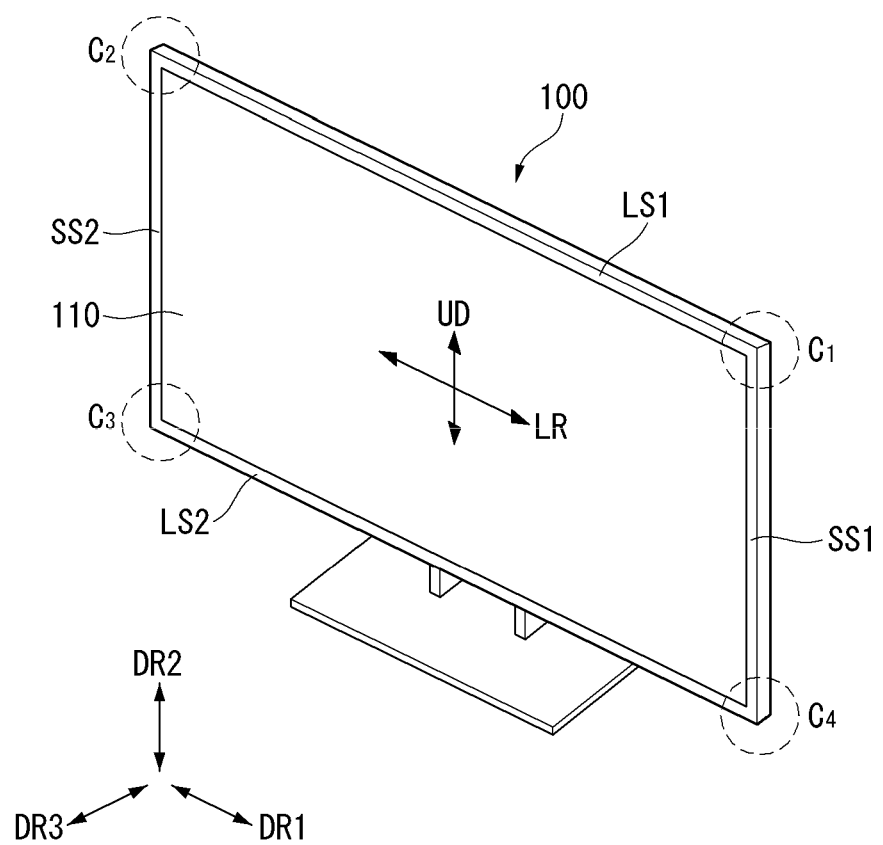
FIGS. 1 and 2 illustrate a display device according to one embodiment of the present disclosure.

Reference will now be made to various embodiments of the invention, examples of which are illustrated in the accompanying drawings. Since the present invention may be modified in various ways and may have various forms, specific embodiments are illustrated in the drawings and are described in detail in the present specification. However, it should be understood that the present invention is not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, the embodiments of the invention are described using a liquid crystal display panel as an example of a display panel. Other display panels may be used. For example, a plasma display panel (PDP), a field emission display (FED) panel, an organic light emitting diode (OLED) display panel, or another appropriate type of display panel may be used.

In what follows, a display device 100 may include a first long side LS1, a second long side LS2 opposite the first long side LS1, a first short side SS1 adjacent to the first long side LS1 and the second long side LS2, and a second short side SS2 opposite the first short side SS1.

In the present disclosure, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

The present disclosure describes that lengths of the first and second long sides LS1 and LS2 are longer than lengths of the first and second short sides SS1 and SS2 for the sake of brevity and ease of reading. However, the present disclosure is not limited thereto. For example, the lengths of the first and second long sides LS1 and LS2 may be almost equal to the lengths of the first and second short sides SS1 and SS2.

In the following description, a first direction DR1 may be a direction parallel to the long sides LS1 and LS2 of the display device 100, and a second direction DR2 may be a direction parallel to the short sides SS1 and SS2 of the display device 100. Further, a third direction DR3 may be a direction vertical to the first direction DR1 and/or the second direction DR2. In the embodiments disclosed herein, the first direction DR1 and the second direction DR2 may be commonly referred to as a horizontal direction. Further, the third direction DR3 may be referred to as a vertical direction.

Figure 2:
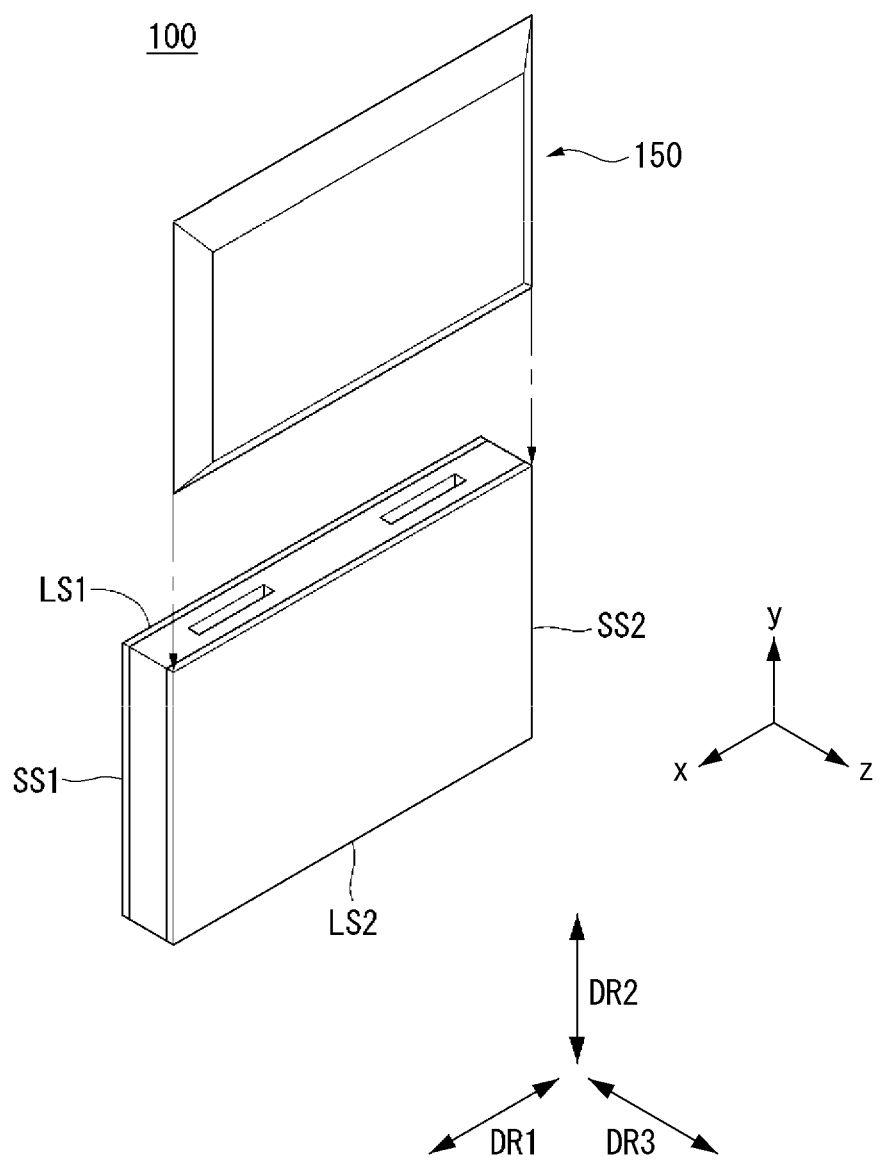

FIGS. 1 and 2 illustrate a display device according to one embodiment of the present disclosure. A display device 100 may include a display panel 110 and a back cover 150 on the rear surface of the display panel 110.

The back cover 150 may be assembled into the display panel 110 in a direction from a first long side LS1 pointing to a second long side LS2, namely in a second direction DR2 in a sliding manner. In other words, the back cover 150 may be inserted along a first short side SS1 of the display panel 110 and a second short side SS2 opposing the first short side SS1 from a first long side LS1 adjacent to the first SS1 and the second short side SS2 and located between the first SS1 and the second short side SS2 in a sliding manner.

In order to connect the back cover 150 to the display panel 110 in a sliding manner, the back cover 150 and/or other structures adjacent thereto may include a protruding part, sliding part, and combining part.

Figure 3:
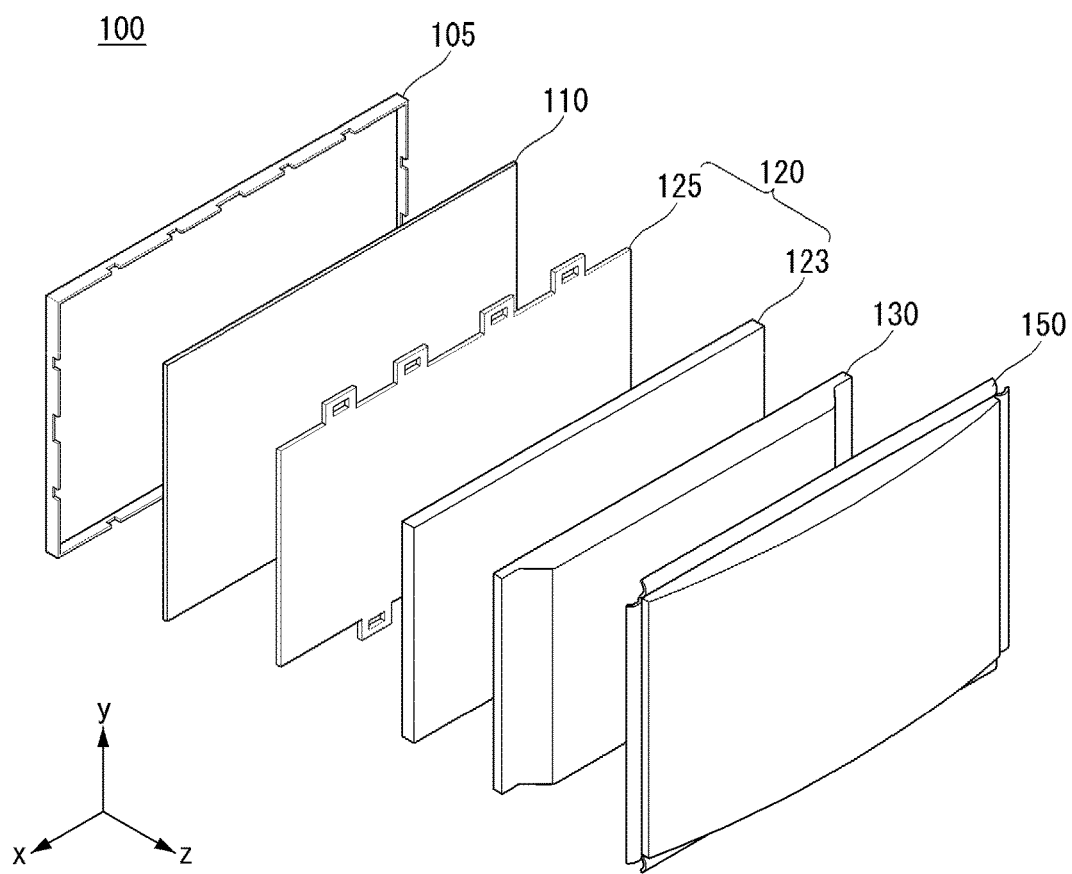

FIGS. 3 to 7 illustrate the structure of a display device. As shown in FIG. 3, a display device 100 may include a front cover 105, display panel 110, backlight unit 120, frame 130, and back cover 150.

The front cover 105 may cover the front surface of the display panel 110 and at least part of the side surface of the display panel 110. The front cover 105 may be in the form of a rectangular frame with a hollow center. Since the central part of the front cover 105 is empty, an image of the display panel 110 may be displayed to the outside.

The front cover 105 may be divided into a front cover and a side cover. In other words, the front cover 105 may be divided into a front cover located on the front surface side of the display panel 110 and a side cover located on the side surface side of the display panel 110. The front cover and the side cover may be formed separately. Either the front cover or the side cover may be omitted. For example, for the purpose of aesthetic design and the like, the front cover may be removed while the side surface is retained.

The display panel 110 is provided on the front surface of the display device 100, where an image may be displayed. The display panel 110 may display an image by dividing an image into a plurality of pixels and controlling each pixel to emit light according to a proper color, brightness, and saturation level of the pixel. The display panel 110 may be divided into an active area in which an image is displayed and an inactive area in which an image is not displayed. The display panel 110 may include a front substrate and a rear substrate facing each other with a liquid crystal layer interposed between them.

The front substrate may include a plurality of pixels comprising red (R), green (G), and blue (B) subpixels. The front substrate may generate an image corresponding to red, green, or blue color according to a control signal.

The rear substrate may include switching components. The rear substrate may switch between pixel electrodes. For example, a pixel electrode may change molecular arrangement of a liquid crystal layer according to an externally applied control signal. A liquid crystal layer may include a plurality of liquid crystal molecules. Liquid crystal molecules may change their arrangement in accordance with a voltage difference developed between a pixel electrode and a common electrode. A liquid crystal layer may deliver light provided from the backlight unit 120 to the front substrate.

The backlight unit 120 may be located on the rear surface of the display panel 11. The backlight unit 120 may include a plurality of light sources. The light source of the backlight unit 120 may be arranged in the form of a direct-type or an edge-type light source. In the case of edge-type backlight unit 120, a light guide panel may be further included.

The backlight unit 120 may be coupled to the front side of the frame 130. For example, a plurality of light sources may be arranged on the front surface of the frame 130, which may be called collectively a direct-type backlight unit.

The backlight unit 120 may be driven by a full-driving method or a local driving method such as local dimming or impulsive dimming. The backlight unit 120 may include an optical sheet 125 and an optical layer 123.

An optical sheet 125 may transmit light emitted from a light source uniformly to the display panel 110. The optical sheet 125 may be composed of a plurality of layers. For example, the optical sheet 125 may include at least one prism sheet and/or at least one diffusion sheet.

At least one combining part may be formed in the optical sheet 125. The combining part 125d (FIG. 5) may be combined with the front cover 105 and/or back cover 150. In other words, the combining part 125d may be combined directly with the front cover 105 and/or back cover 150. On the other hand, the combining part 125d may be combined with a structure that is combined with the front cover 105 and/or back cover 150. In other words, the combining part may be combined indirectly with the front covert 105 and/or back cover 150.

The optical layer 123 may include a light source. A detailed description about the structure of the optical layer 123 will be provided in the corresponding part of this disclosure.

The frame 130 may serve to support the components of the display device 100. For example, a component such as the backlight unit 120 may be coupled to the frame 130. The frame 130 may be made of a metallic material such as aluminum alloy.

The back cover 150 may be located on the rear surface of the display device 100. The back cover 150 may protect the internal structure from an external impact. At least part of the back cover 150 may be combined with the frame 130 and/or front cover 105. The back cover 150 may be an injection molded article made of resin.

Figure 4A:
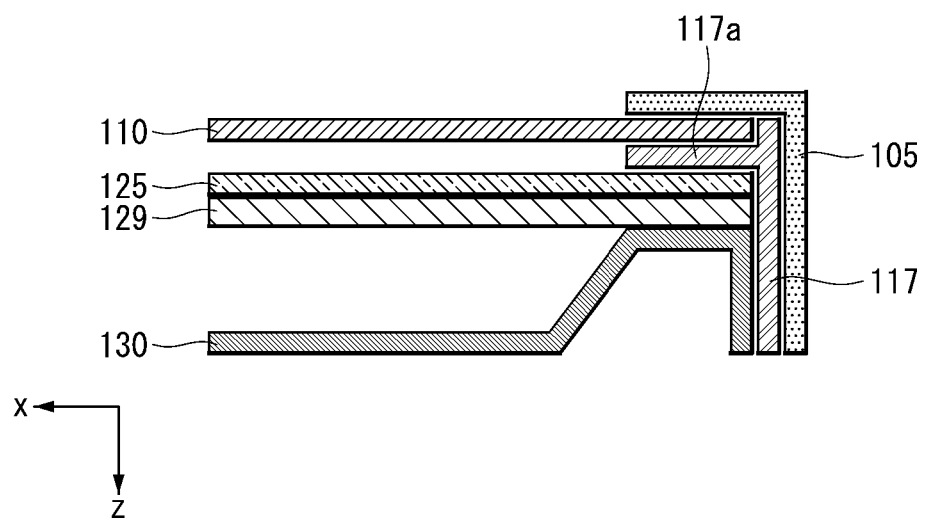
Figure 4B:
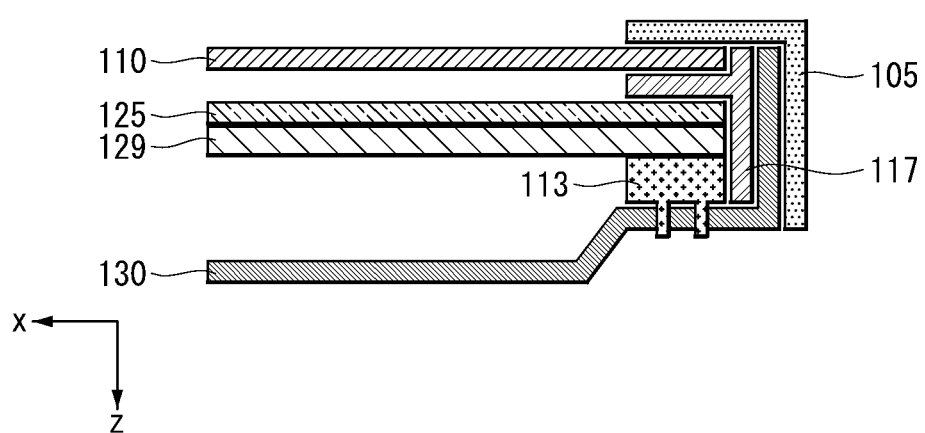
Figure 4C:
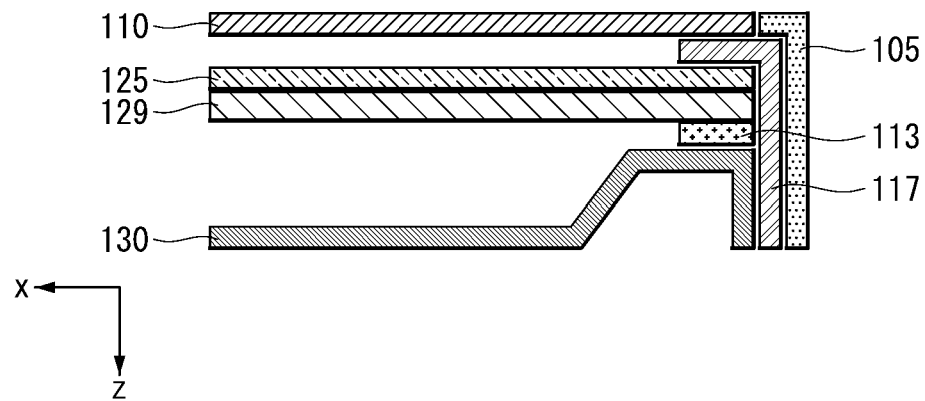

FIGS. 4A to 4C illustrate a structure of the optical sheet 125. As shown in FIG. 4A, an optical sheet 125 and/or diffusion plate 129 may be located on the upper part of the frame 130. The optical sheet 125 and/or diffusion plate 129 may be combined with the frame 120 at the boundary of the frame 130. The optical sheet 125 and/or diffusion plate 129 may be installed directly at the edge of the frame 130. In other words, the outer periphery of the optical sheet 125 and/or diffusion plate 129 may be supported by the frame 130. The upper surface of the optical sheet 125 and/or diffusion plate 129 may be wrapped by a first guide panel 117. For example, the optical sheet 125 and/or diffusion plate 129 may be located between the edge of the frame 130 and the flange 117a of the first guide panel 117.

The display panel 110 may be located on the front surface of the optical sheet 125. The boundary of the display panel 110 may be combined with a first guide panel 117. In other words, the first guide panel 117 may support the display panel 110.

The peripheral region of the front surface of the display panel 110 may be wrapped or covered by a front cover 105. For example, the display panel 110 may be placed between the first guide panel 117 and the front cover 105.

As shown in FIG. 4B, a display device 100 according to one embodiment of the present disclosure may include a second guide panel 113. The optical sheet 125 and/or diffusion plate 129 may be combined with the second guide panel 113. In other words, the second guide panel 113 may be combined with the frame 130, and the optical sheet 125 and/or diffusion plate 129 may be combined with the second guide panel 113. The second guide panel 113 may be made of a material different from that used to make the frame 130. The frame 130 may be structured so that it encloses the first 117 and second guide panel 113.

As shown in FIG. 4C, the display device 100 according to one embodiment of the present disclosure may be made so that the front cover 105 does not cover the front surface of the display panel 110. In other words, one end of the front cover 105 may be disposed on the side surface of the display panel 110.

Figure 5:
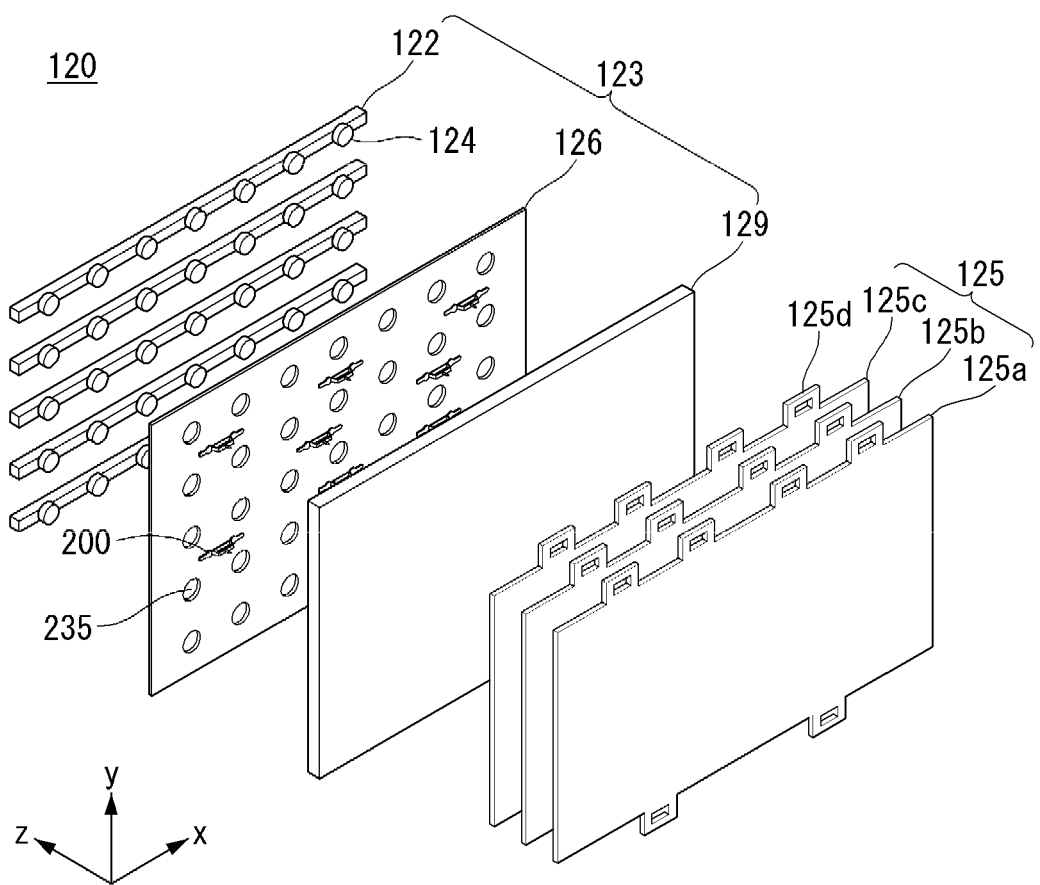

With reference to FIGS. 5 and 6, the backlight unit 120 may include a substrate 122, at least one optical assembly 124, an optical layer 123 including a reflecting sheet 126 and a diffusion plate 129, and an optical sheet 125 located on the front surface of the optical layer 123.

The substrate 122 may be formed by a plurality of straps extending in a first direction and separated from each other by a predetermined distance in a second direction orthogonal to the first direction. In the substrate 122, at least one optical assembly 124 may be installed. An electrode pattern for connecting an adaptor to the optical assembly 124 may be formed on the substrate 122. For example, a carbon nano-tube electrode pattern to connect the optical assembly and the adaptor to each other may be formed on the substrate 122.

The substrate 122 may be composed of at least one of polyethylene terephthalate (PET), glass, polycarbonate (PC), silicon or another appropriate type of material. The substrate 122 may be a printed circuit board (PCB) on which at least one optical assembly 124 may be installed.

On the substrate 122, an optical assembly 124 may be disposed at predetermined intervals in a first direction (e.g., X direction). The diameter of the optical assembly 124 may be larger than the width of the substrate. In other words, the diameter of the optical assembly 124 may be larger than the length in a second direction (e.g., Y direction).

The optical assembly 124 may be an LED (light emitting diode) chip or an LED package which includes at least one LED chip. The optical assembly 124 may be composed of a colored LED or a white LED that emits at least one of red, blue, and green color. A colored LED may include at least one of a red LED, blue LED, and green LED.

The light source included in the optical assembly 124 may be a Chip-On-Board (COB) type. The COB type may be constructed so that an LED chip, which is a light source, is installed directly on the substrate 122. Therefore, the COB type light source may simplify fabrication process. Also, the COB type light source may lower resistance, thereby reducing the energy lost by heat due to resistance.

A reflecting sheet 126 may be provided on the front surface of the substrate 122. The reflecting sheet 126 may be located on the region of the substrate 122 other than the region where the optical assembly 124 is formed. In other words, a plurality of through-holes 235 may be formed in the reflecting sheet 126.

The reflecting sheet 126 may reflect the light emitted from the optical assembly 124 to the front surface. Also, the reflecting sheet 126 may again reflect the light reflected from the diffusion plate 129.

The reflecting sheet 126 may include at least one of a metal and a metal oxide as a reflective material. For example, the reflective sheet 126 may include a metal and/or a metal oxide having a high reflectance such as at least one of aluminum (Al), silver (Ag), gold (Au), and titanium dioxide (TiO2).

The reflecting sheet 126 may be formed by depositing and/or coating a metal or metal oxide on the substrate 122. The reflective sheet 126 may be printed with ink containing metallic materials. The reflection sheet 126 may have a vapor deposition layer formed by a vacuum vapor deposition method such as a thermal vapor deposition method, an evaporation method, a sputtering method or another appropriate type of method. The reflecting sheet 126 may have a coating layer and/or a printing layer formed by using a printing method, gravure coating method, silk screen method or another appropriate type of method.

Figure 6A:
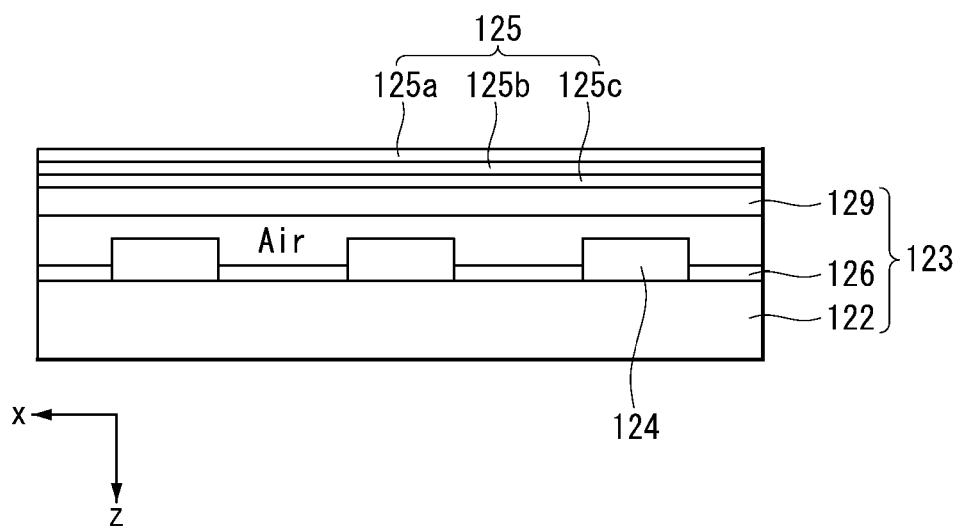
Figure 6B:
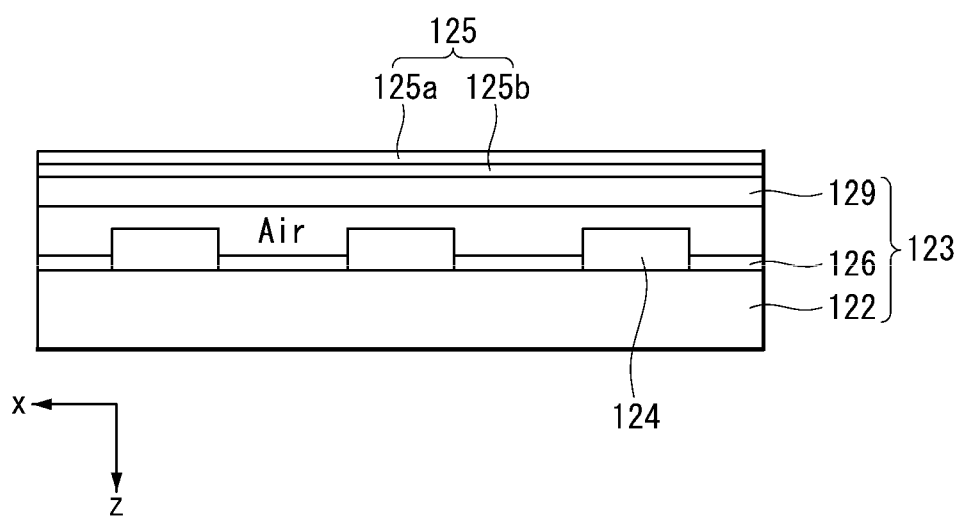

As illustrated in FIGS. 6A and 6B, an air gap may be formed between the reflecting sheet 126 and the diffusion plate 129. The air gap may be used as a buffer through which the light emitted from the optical assembly 124 may spread widely. To maintain the air gap, a supporter 200 may be formed between the reflecting sheet 126 and the diffusion plate 129.

Resin may be deposited on the optical assembly and/or reflecting sheet 126. The resin may serve to diffuse the light emitted from the optical assembly 124. Moreover, the diffusion plate 129 may spread the light emitted from the optical assembly 124 to the upper side.

The optical sheet 125 may be located on the front surface of the diffusion plate 129. The rear surface of the optical sheet 125 may be attached tightly to the diffusion plate 129, and the front surface of the optical sheet 125 may be attached tightly to the rear surface of the display panel 110.

The optical sheet 125 may include one or more sheets. More specifically, the optical sheet 125 may include one or more prism sheet and/or one or more diffusion sheet. A plurality of sheets included in the optical sheet 125 may be in an adhered and/or tightly attached state.

The optical sheet 125 may be composed of a plurality of sheets providing different functions. For example, the optical sheet 125 may include a first to a third optical sheet (125a to 125c). The first optical sheet 125a may provide a function of a diffusion sheet, and the second optical sheet 125b and the third optical sheet 125c (125b, 125c) may provide a function of a prism sheet. The number and/or locations of the diffusion sheets and prism sheets may be changed. For example, the optical sheet 125 may include the first optical sheet 125a which is a diffusion sheet and the second optical sheet 125b which is a prism sheet.

A diffusion sheet may prevent the light emitted from the diffusion plate from being concentrated locally, thereby making brightness of the light more uniform. A prism sheet may condense light coming from the diffusion sheet and make the light incident on the display panel 110 to be in a normal direction.

The combining part 125d may be formed on at least one of the edges of the optical sheet 125. The combining part 125d may be formed on at least one of the first to third optical sheet (125a to 125c).

The combining part 125d may be formed at the edge of the long side of the optical sheet 125. The combining part 125d formed at the first long side and the combining part 125d formed at the second long side may be asymmetric. For example, the combining part 125d of the first long side and the combining part 125d of the second long side may differ from each other in terms of locations and/or the number of combining parts.

With reference to FIG. 7, a substrate 122 may be provided, which is composed of a plurality of straps (also referred to as strips or rows) extending in a first direction (e.g., X direction) on the frame 130 and separated from each other by a predetermined distance in a second direction (e.g., Y direction) orthogonal to the first direction. One end of a plurality of substrates 122 may be connected to a wiring electrode 232.

The wiring electrode may be extended in a second direction. The wiring electrode 232 may be connected to one end of the substrate 122 with a predetermined spacing in the second direction. Through the wiring electrode 232, the substrate 122 may be electrically connected to an adaptor electrically.

Optical assemblies 124 may be installed on the substrate 122 with a predetermined spacing in the first direction. The diameter of the optical assembly 124 may be larger than the width of the substrate 124 in the second direction. Accordingly, the outer region of the optical assembly 124 may cross into a region not supported by the substrate 122.

Figure 9:
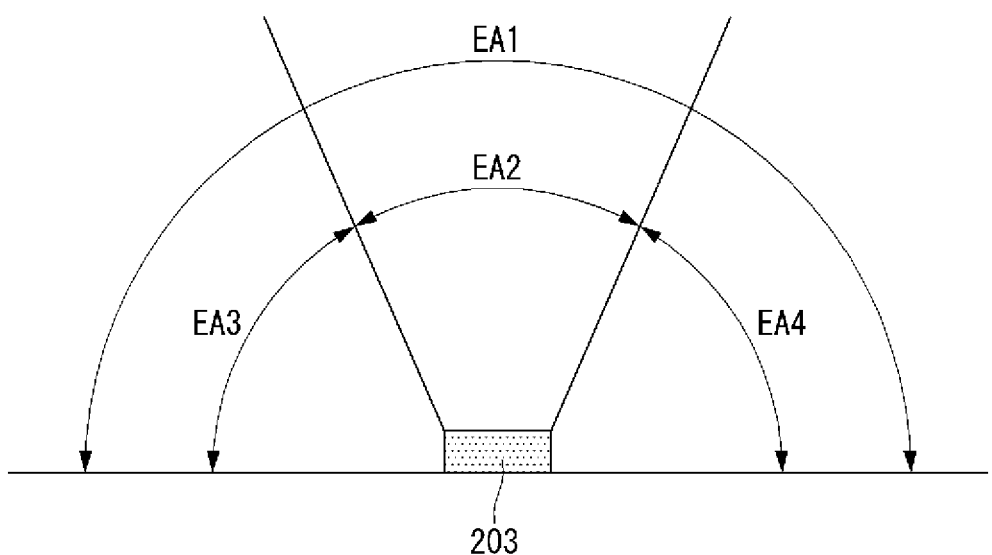

FIGS. 8 and 9 illustrate a light source according to one embodiment of the present disclosure. As shown in FIG. 8, the light source 203 may be a COB type. A COB type light source 203 may include at least one of a light emitting layer 135, a first electrode 147 and a second electrode 149, and a fluorescent layer 137.

The light emitting layer 135 may be located on the substrate 122. The light emitting layer 135 may emit at least one of blue, red, and green color. The light emitting layer 135 may include at least one of Firpic, (CF3ppy)2Ir(pic), 9,10-di(2-naphthyl)anthracene(AND), Perylene, distyrybiphenyl, PVK, OXD-7, UGH-3(Blue) and a combination thereof.

The first electrode 147 and the second electrode 149 may be located on both sides of the lower surface of the light emitting layer 135. The first electrode 147 and the second electrode 149 may deliver an external driving signal to the light emitting layer 135.

The fluorescent layer 137 may cover the light emitting layer 135, the first electrode 147 and the second electrode 149. The fluorescent layer 137 may include a fluorescent material that converts the light of a specific spectrum generated at the light emitting layer 135 to white light. In the upper part of the fluorescent layer 137, thickness of the light emitting layer 135 may be uniform. The fluorescent layer 137 may have a refractive index of 1.4 to 2.0.

The COB type light source 203 according to the present disclosure may be installed directly on the substrate 122. Therefore, size of the optical assembly 124 may be reduced.

Since heat dissipation performance is excellent as the light source 203 is located on the substrate 122, the COB type light source 203 may be driven by a high current. Accordingly, the number of light sources 203 required to secure the same amount of light may be reduced.

As the light source 203 is installed on the substrate 122, a wire bonding process may not be needed. Thus, costs may be saved due to simplification of the manufacturing process.

As shown in FIG. 9, the light source 203 according to the present disclosure may emit light across a first light emission area EA1. In other words, light may be emitted over the area including a second light emission area EA2 in the front side and a third EA3 and a fourth light emission area EA4 at the sides. This is different from existing light sources including the POB type which emit light in the second light emission area EA2. In other words, the light source 203 according to one embodiment of the present disclosure may be a COB-type light source, and the COB type light source 203 may emit light over a wide area including side areas.

Since the COB type light source 203 emits light in a direction corresponding to the third and fourth light emission areas EA3 and EA4 in the side area, it is necessary to effectively control the light emitted sideways. A reflecting sheet according to one embodiment of the present disclosure may adjust reflectance of light emitted sideways from the light source. Therefore, non-uniformity of brightness due to the light emitted sideways may be reduced.

Figure 10:
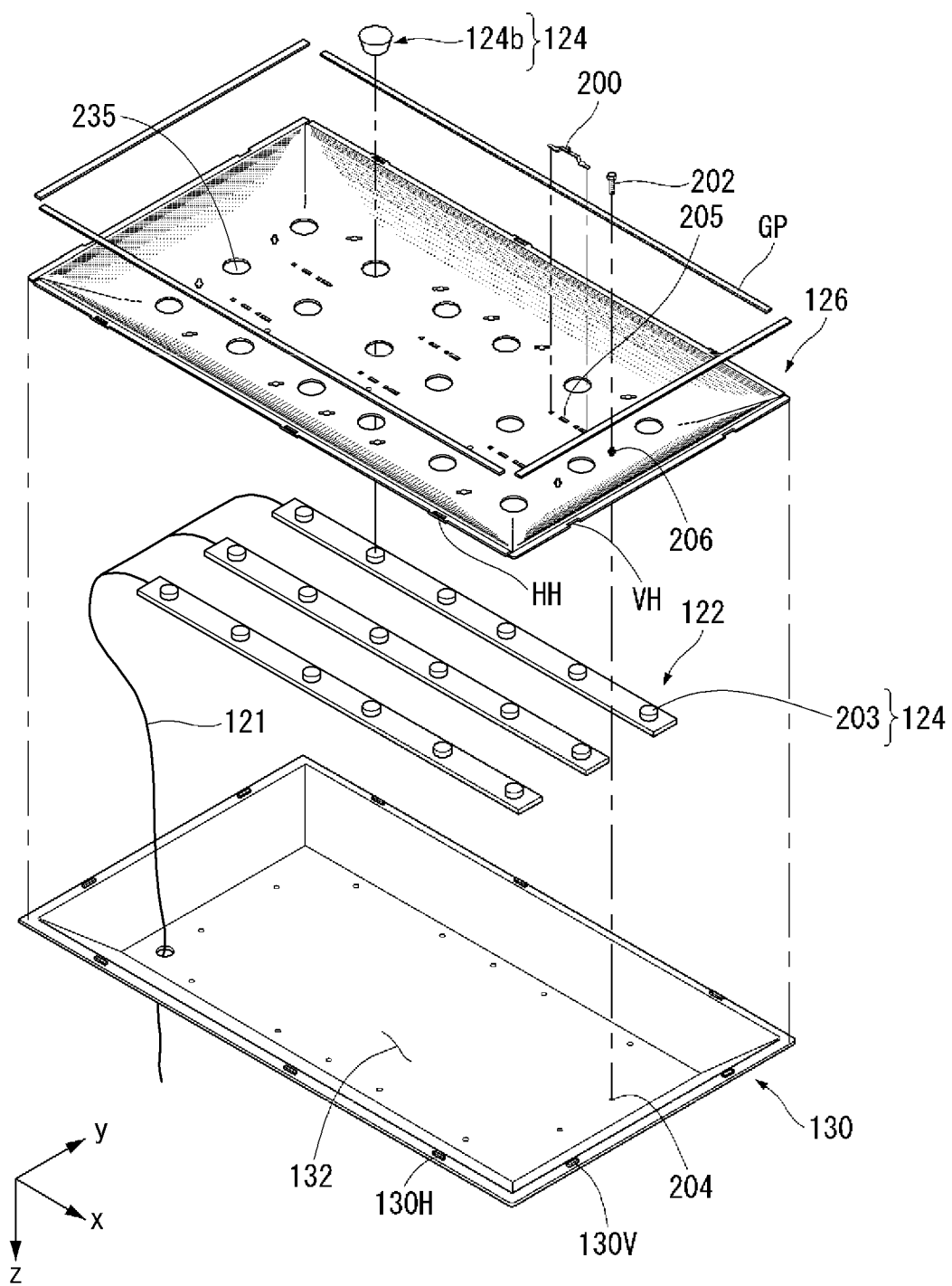
FIG. 10 illustrates an assembling relationship between a reflecting sheet and a peripheral structure according to one embodiment of the present disclosure.

FIG. 10 illustrates an assembling relationship between a reflecting sheet and a peripheral structure according to one embodiment of the present disclosure. The reflecting sheet 126 may be fastened to the frame 130. For example, the reflecting sheet 126 may be combined to a fastening part 132 formed inside the frame 130. The fastening part 132 may be a cavity or a recess formed in the frame 130 to accommodate the reflecting sheet 126. The cavity or recess 132 may be formed on the front surface of the frame 130.

The reflecting sheet 126 may be provided with a horizontal assembling part HH and/or a vertical assembling part VH. For example, assembling holes may be formed in some areas along a long side and/or short side of the reflecting sheet 126.

The horizontal assembling part HH and/or vertical assembling part VH may be inserted into horizontal protrusion 130H and vertical protrusion 130V formed in the frame 130. A guide panel GP may be combined on the reflecting sheet 126.

The guide panel GP may be made of an extruded plastic material or a press-processed metallic material. The guide panel GP may be combined to the horizontal protrusion 130H and/or vertical protrusion 130V. If the guide panel GP is combined on the reflecting sheet 126, the reflecting sheet 126 may be fixed between the frame 130 and the guide panel GP. Though the figure illustrates the case in which the long sides and the short sides of the guide panel GP are separated from each other, it should be appreciated that the long and the short sides may be combined together.

The reflecting sheet 126 fastened to the frame 130 may be formed in a three-dimensional shape corresponding to the shape of the fastening part 132. The reflecting sheet 126 according to one embodiment may realize optimal reflectance even when the reflecting sheet is formed in a three-dimensional shape. For example, light may be reflected uniformly throughout the reflecting sheet 126.

The reflecting sheet 126 may constitute part of the backlight unit (120 of FIG. 5). Between the reflecting sheet 126 and the frame 130, a substrate 122 on which light sources 203 are installed may be located.

A plurality of substrates 122 may be disposed in the horizontal and/or vertical direction. The substrate 122 may be connected to a signal line 121 connected to the controller of the display device 100. The signal line 121 may be connected through a through-hole formed in the frame 130.

The reflecting sheet 126 may include a plurality of lens holes 235. The plurality of lens holes 235 may correspond to the light sources 203 on the substrate 222. For example, the plurality of lens holes 235 may be formed in the horizontal and/or vertical direction so as to correspond to the light sources 203. A lens 124b may be inserted to the lens hole 235. For example, a lens 124b may be combined with the light source 203 through the lens hole 235.

The reflecting sheet 126 may include a plurality of supporter holes 205. A supporter hole 205 may be combined with a supporter 200. A supporter 200 may support a diffusion plate 129 and/or optical sheet 125 located on the front surface of the reflecting sheet 126. In other words, the supporter 200 may serve to separate the reflecting sheet 126 from the diffusion plate 129 and/or optical sheet 125 by a predetermined distance.

The reflecting sheet 126 may include a plurality of fixing pinholes 206. A fixing pin 202 may be combined with the fixing pinhole 260 and combined to the frame hole 204 formed in the frame 130. Therefore, the fixing pin 202 may be used to fix the reflecting sheet 126 to the frame 130.

Figure 11:
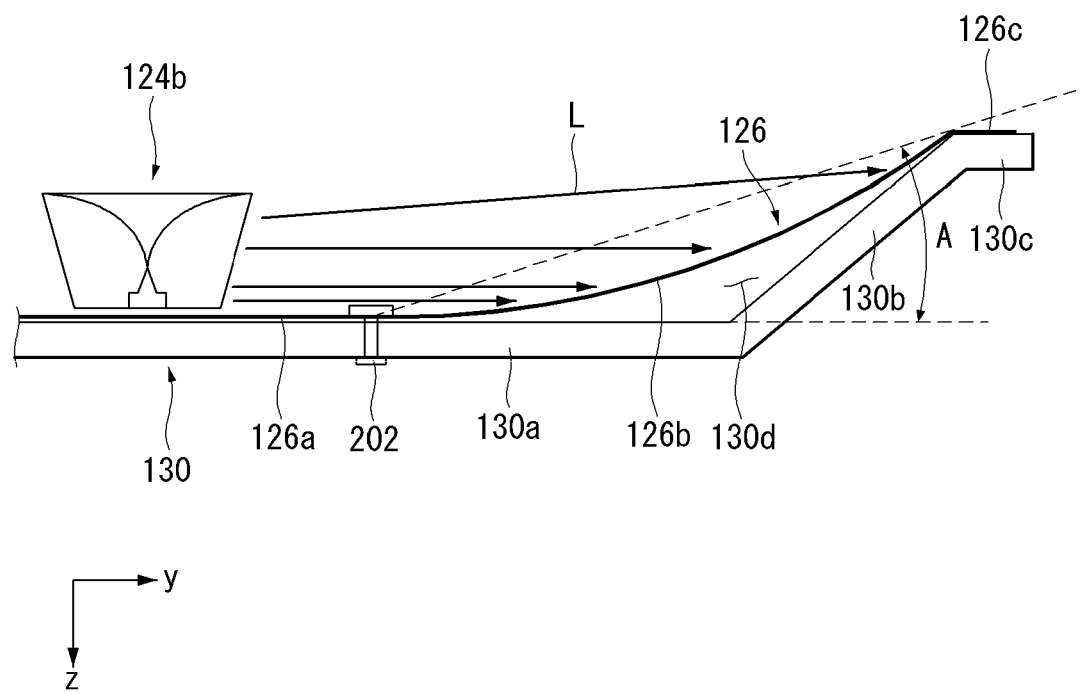
FIGS. 11 to 13 illustrate a distribution of dots of a reflecting sheet according to one embodiment of the present disclosure.
Figure 12:
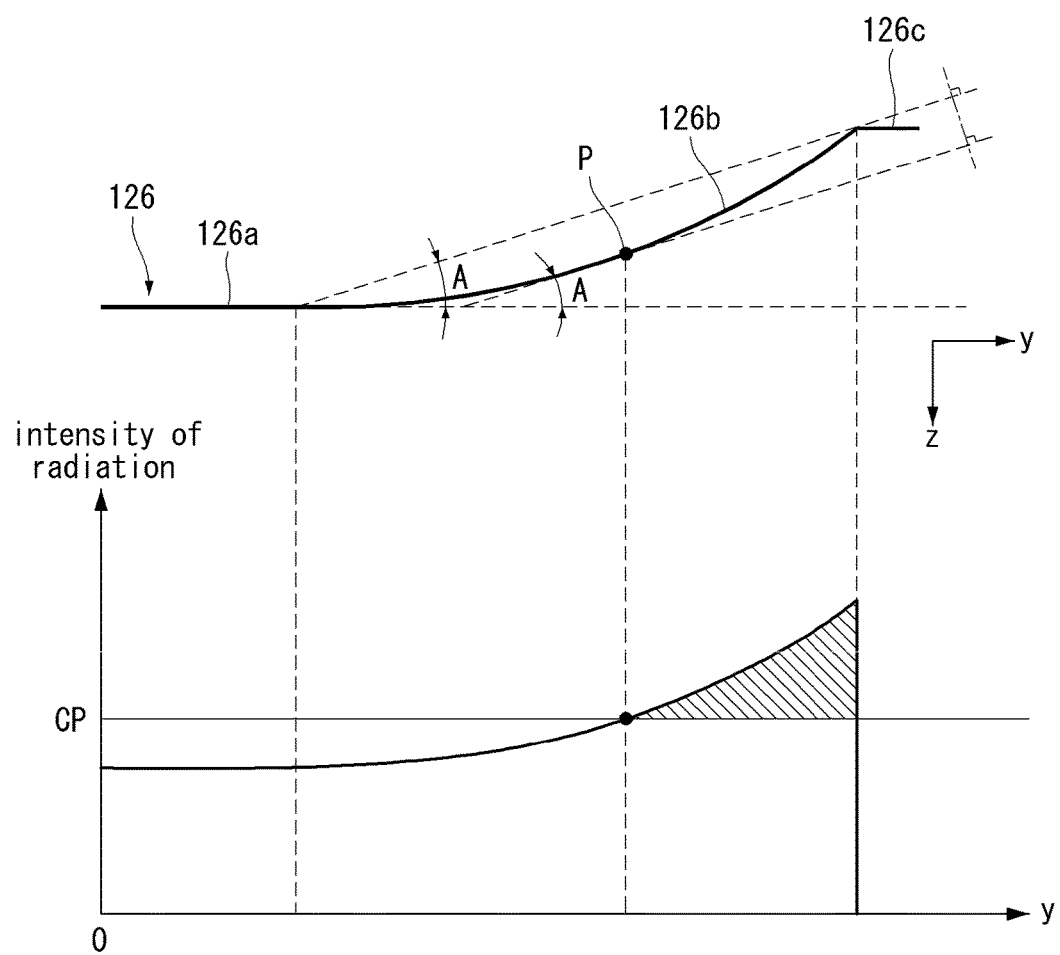
Figure 13:
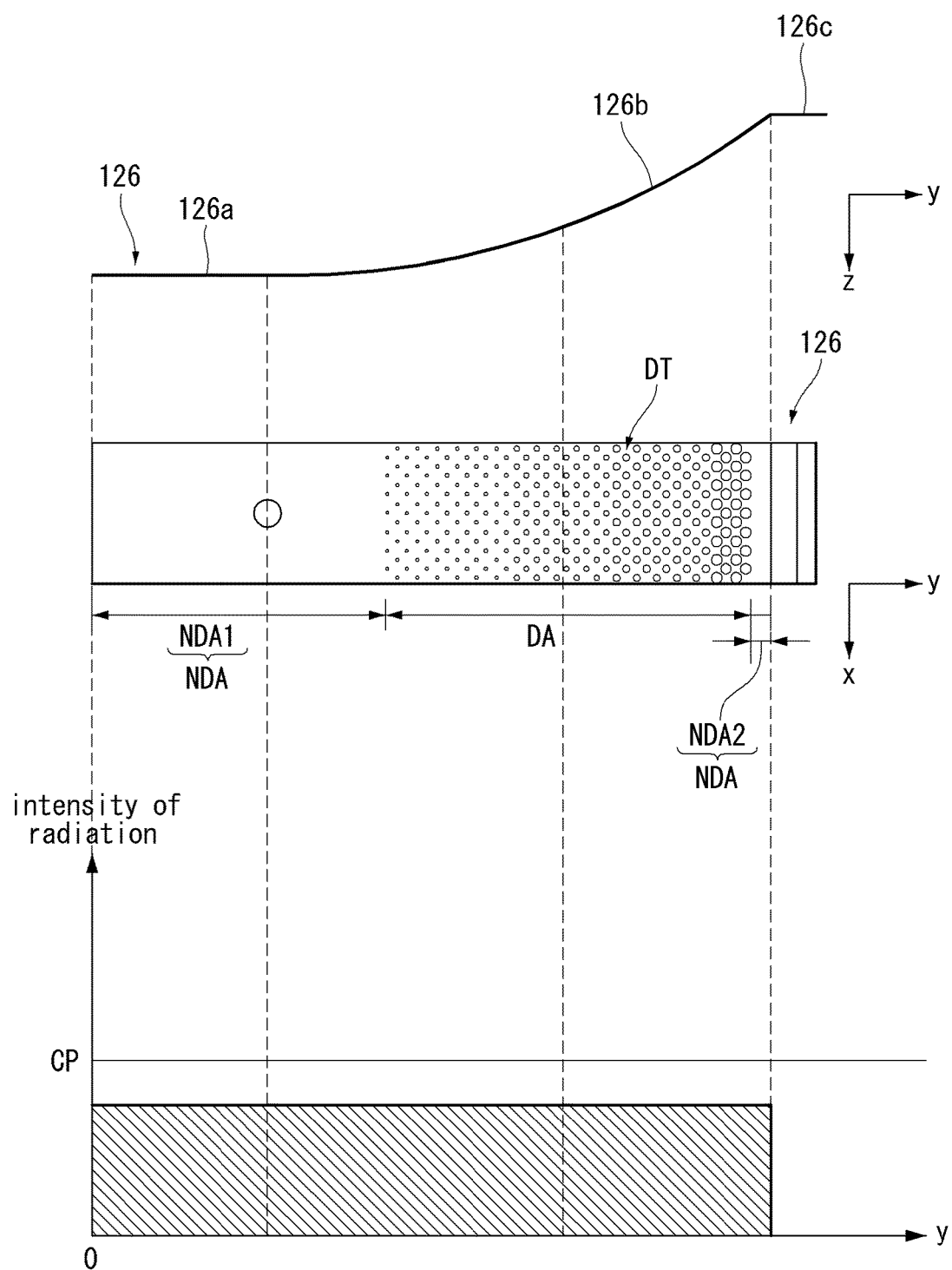

FIGS. 11 to 13 illustrate a structure of a reflecting sheet according to one embodiment of the present disclosure. A reflecting sheet 126 may be secured inside the frame 130. The reflecting sheet 126 secured inside the frame 130 may have a three-dimensional shape according to the shape of the frame 130.

As shown in FIG. 11, the frame 130 may include a first to a third frame area 130a to 130c. The first frame area 130a may be a bottom area of the frame 130. The first frame area 130a may be flat. In other words, the first frame area may be a plane located on the X-Y plane of the display device 100.

The second frame area 130b may be a sidewall surface extended from the first frame area 130a in an upward direction. The second frame area 130b may be parallel to the Z-direction or inclined in an oblique direction with respect to the Z-direction. Due to the second frame area 130b which plays the role of a sidewall of the frame 130, a fastening part 132 (FIG. 10) may be formed inside the frame 130.

The third frame area 130c may be a plane extended in the X-direction from the second frame area 130b. The third frame area 130c may be parallel to the first frame area 130a. In other words, although the height of the third frame area 130c may be different from the height of the first frame area 130a due to the second frame area 130b, it may be a planar surface like the first frame area 130a.

A protruding area may be constructed in the third frame area 130c. Alternatively, protruding structure formed by a separate process may be combined with the third frame area 130c. The reflecting sheet 126 may be coupled to the protruding area of the third frame 130c and/or the protruding structure. For example, the third sheet area 126c of the reflecting sheet 126 may be combined thereto. An optical sheet 125 (FIG. 5) may be coupled to the protruding area of the third frame 130c and/or protruding structure.

The reflecting sheet 126 may be combined with a structure formed by the first, second, and third frame areas (130a to 130c). For example, the reflecting sheet 126 may be combined with the first frame area 130a by the fixing pin 202. Once part of the reflecting sheet 126 is fastened to the first frame area 130a by the fixing pin 202, other parts of the reflecting sheet 126 may come into contact to the frame 130 naturally.

For example, if the reflecting sheet 126 is combined with the frame 130 through the fixing pin 202, the shape of the reflecting sheet 126 may adapt naturally to the shape of the frame 130. In other words, a naturally rounded second sheet area 126b may be formed. Therefore, an additional fabrication process for forming a chamfer of the reflecting sheet 126 may not be needed, thereby improving work productivity.

The reflecting sheet 126 may include the first to third sheet areas 126a to 126c. Here, areas of the reflecting sheet 126 may be distinguished from one another according to whether the reflecting sheet 126 comes into contact with the frame 130. For example, the reflective sheet 126 may be divided into a contacting arear which makes contact to the frame 130 and a non-contacting area which does not contact the frame 130.

The first 126a and the second sheet area 126b may be distinguished from each other by the fixing pin 202. In other words, the second sheet area 126b may be the area formed between the fixing pin 202 and the point at which the reflecting sheet 126 comes into contact with the area of the third frame 130c. Hence, the first 126a and the second sheet area 126b may be distinguished from each other according to whether the reflecting sheet is in contact with the first area 130a of the frame 130.

The second sheet area 126b may be separated naturally from the frame 130 due to physical properties or elasticity of the reflecting sheet 126 itself. For example, if the first sheet area 126b is combined with the frame 130 by the fixing pin 202, the second sheet area 126b may naturally form a curved surface due to its own weight to be separated from the frame 130. A separation space 130d may be formed between the second sheet area 126b and the frame 130. In the second sheet area 126b, the angle formed between the reflecting sheet 126 and the bottom area of the frame 130 may increase gradually. In other words, the reflecting sheet 126 may be disposed so that it is in the form of a two-dimensional curve within the non-contacting area. It may also be possible that the second sheet area 126b is separated from the frame 130 at a predetermined angle.

The third sheet area 126c may be secured in the third frame area 130c. The third sheet area 126c may be combined with the third frame area 130c. Or the third sheet area 126c may be formed to be laid naturally on the third frame area 130c. In other words, the third sheet area 126c may be brought into contact with the third frame area 130c due to the elastic force in the Z-direction developed as the second sheet area 126c forms a curved surface.

Light (L) may be emitted through a lens 124b. The light generated by the light source 203 may be emitted to the outside through the lens 124b. The light (L) emitted through the lens 124b may propagate along various paths. For example, some of the light (L) may pass through a path at a side surface of the lens 124b.

Part of the light (L) passing sideways may be directed to the second sheet area 126b. At least part of the light generated by the light source 203 may be totally reflected inside the lens 124b to be directed to the second sheet area 126b. In this case, even in the second sheet area 126b, the amount of light directed to an upward area may be larger than the amount of light directed to a downward area. To phrase differently, the amount and/or density of light (L) delivered to the reflecting sheet 130 may not be uniform. In case the amount and/or density of light (L) is not uniform, the user watching the display device 100 may recognize the difference due to the non-uniformity. For example, in case more light (L) is incident on the upper area than the lower area of the second sheet area 126b, the corresponding area may look brighter than the other areas due to the light (L) reflected from the upper area.

As illustrated in FIG. 12, the angle between the extension line starting from the boundary between the first sheet area 126a and the second sheet area 126b to the boundary between the second sheet area 126b and the third sheet area 126c and a line parallel to the X-direction is denoted as A. The inclination angle may be increased from the point P which is the intersection point of the second sheet area 126b and the line with a slope angle A. In other words, the inclination angle from the X-direction may grow rapidly after the intersection point P is passed (shaded region).

Since the inclination angle of the second sheet area 126b increases after the intersection point P, the density of light (L) per unit area emitted from the lens (124b of FIG. 11) may become larger. Therefore, the corresponding part may appear brighter than the other areas. Accordingly, the user may feel that the light is emitted in a non-uniform manner. The display device 100 according to one embodiment of the present disclosure may reflect the light in a uniform manner from the reflecting sheet 126 to address this problem. Therefore, the user may not feel the unevenness of light emission or may be less sensitive to the unevenness.

As shown in FIG. 13, dots (DT) may be formed in at least part of the reflecting sheet 126 of the display device 100 according to one embodiment of the present disclosure.

Dots (DT) may be applied in a different pattern for the respective areas. The Dots (DT) have be a prescribed structure formed on the reflecting sheet 126 to have a shape of a dot. For ease of discussion, these structures will be referred to herein as dots. Dots (DT) may form an uneven (concave and/or convex) portion on the reflecting sheet 126. Dots (DT) may form a colored area on at least part of the reflecting sheet 126. For example, the colored area may be an area with a relatively dark color. For example, the colored area may be a black or gray area. Dots (DT) may form an area combined with an uneven portion and a colored area. Dots (DT) may form a geometric shape different from each other in terms of at least one of shape, size, position, and color. For example, dots (DT) may form one of various shapes such as a circle, ellipse, rectangle, bar-shape, triangle, or the line, on the reflecting sheet 126, or a combination of the various shapes.

Dots (DT) may have an influence on the reflectivity of the corresponding area. In other words, dots (DT) may change reflectivity of light. For example, dots (DT) may decrease the reflectivity of light according to at least one of size, shape, position, and color. Dots (DT) may form a dot area (DA) in which a plurality of dots (DT) are gathered.

The dot area (DA) may be a collection of dots (DT) and may form a prescribed pattern. In other words, the dot area (DA) may be a particular area comprising plurality of dots (DT), for each of which at least shape, size, position, or color is the same or different. A dot area (DA) may be formed on at least one part of the second sheet area 126b. As described above, due to the inclined disposition of the second sheet area 126b, density of light per unit area may be high. The dot area (DA) may change the reflectivity of light incident on the second sheet area 126b to counteract the variance caused by the curvature of the reflecting sheet. In other words, although the density of light incident on the unit area is high, density of light reflected may be lowered. Therefore, light intensity of the region corresponding to the second sheet area 126b may be prevented from being made different from the other regions. In other words, due to the existence of the dot area DA, light may be reflected uniformly across the whole reflecting sheet 126.

A non-dot area NDA may be formed additionally on the reflecting sheet 126. The non-dot area NDA may be an area that does not contain dots DT. Non-dot areas NDAs may be located at various parts of the reflecting sheet 126. For example, the non-dot area NDA may include a first NDA1 and a second non-dot area NDA2.

The second non-dot area NDA2 may be located in the boundary area between the second sheet area 126b and the third sheet area 126c. The second non-dot area NDA2 may be located further into the second sheet area 126b in the boundary area between the second sheet area 126b and the third sheet area 126c.

The second non-dot area NDA2 may be formed in the top-most area of the second sheet area 126b, thus, it may be located closely to the front optical sheet 125 and/or diffusion plate 129. Therefore, if dots DT are used in the second non-dot area NDA2, the dots DT may be viable to the user of the display device 100. For this reason, the second non-dot area NDA2 may be configured to not contain dots DT.

Moreover, the pattern of dots are illustrated as changing with respect to the Y-axis merely for convenience in description. However, it should be appreciated that the pattern may be provided relative to any side of the display device 100 corresponding to a curved portion of the reflecting sheet 126.

FIGS. 14A to 17B illustrate a distribution of dots in a reflecting sheet according to one embodiment of the present disclosure.

Figure 14A:
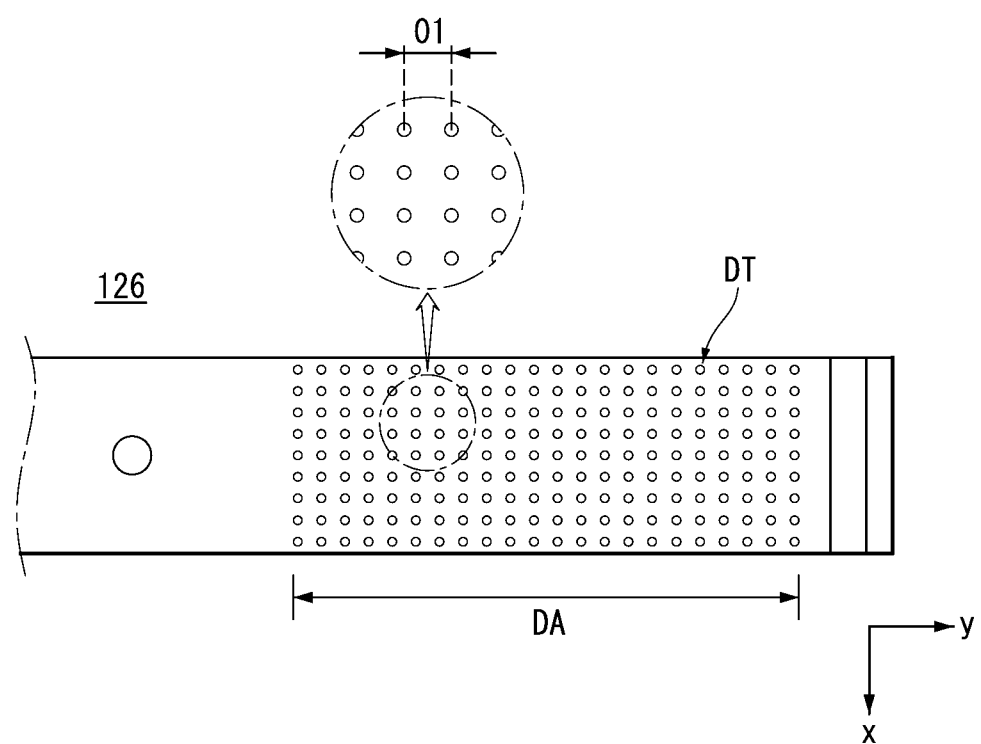
FIGS. 14A to 17B illustrate a distribution of dots in a reflecting sheet according to one embodiment of the present disclosure.

Dots DT may be disposed in various ways on the reflecting sheet 126. As shown in FIG. 14A, dots DT may be disposed on the dot area DA. Neighboring dots DT may be separated from each other by a first distance O1. In other words, spacing between dots DT may be uniform. The spacing between dots DT may influence the reflectivity. For example, if the dots DT are tightly spaced, reflectivity may be lowered.

Figure 14B:
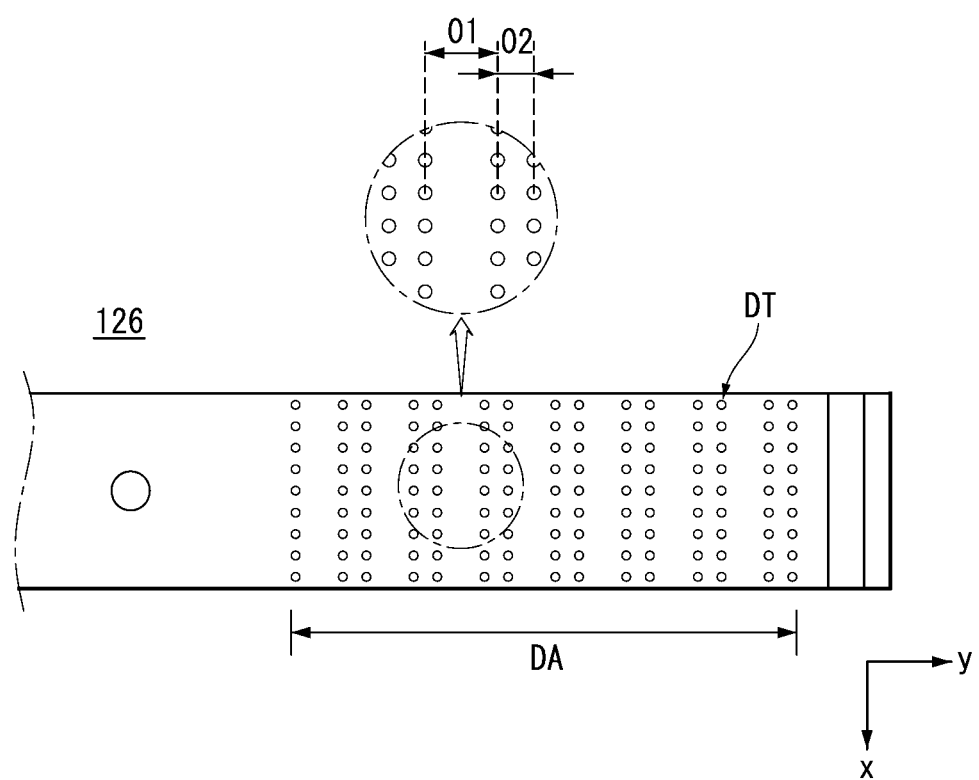

As shown in FIG. 14B, for some cases, neighboring dots DT may be separated by a first distance O1 while they may be separated by a second distance O2 for other cases. In other words, spacing between dots may be varied.

Figure 15A:
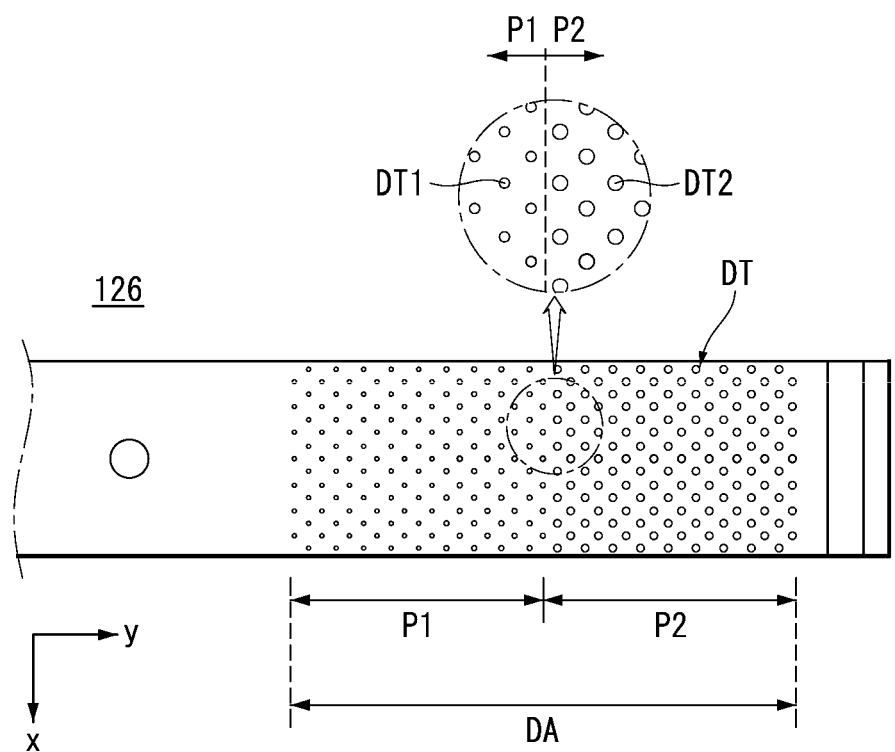

As shown in FIG. 15A, the dot area DA may be divided into two separate areas. For example, the dot area DA may be divided into a first area P1 and a second area P2. Dots DT belonging to the first P1 and the second area P2 may have different attributes respectively. For example, size of the first dot DT1 of the first area P1 and at least one of size, density, and color of the second dot DT2 of the second area P2 may be different from each other.

The second area P2 may be an area located further outside than the first area (P1). In other words, the second area P2 may be close to the third sheet area 126c. The second dots DT2 of the second area P2 may be larger than the first dots DT1 of the first area P1. Therefore, reflectance of the second area P2 may be smaller than that of the first area P1.

Figure 15B:
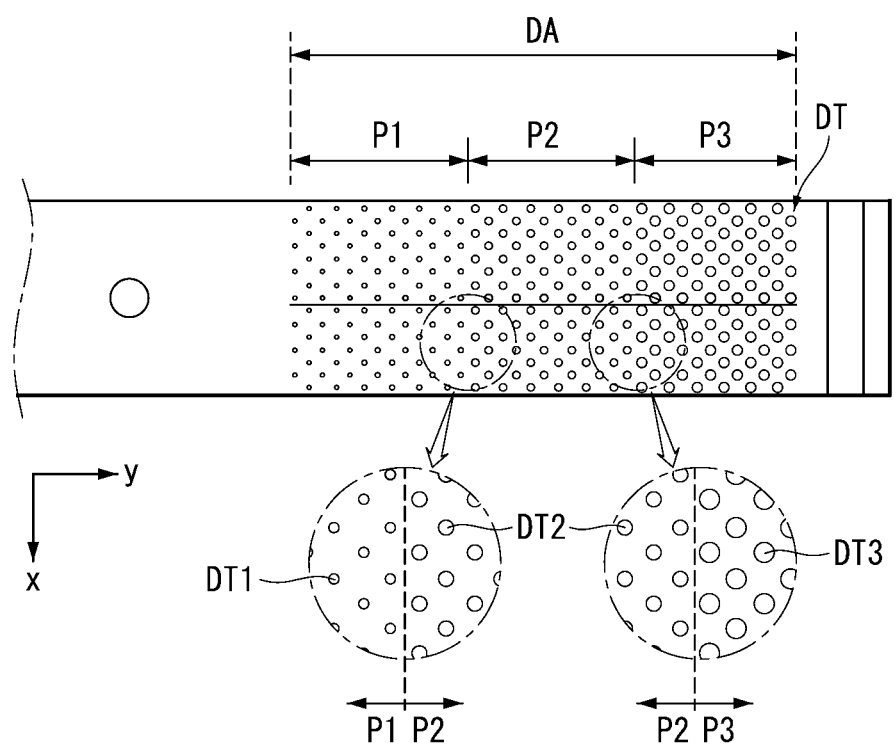

As shown in FIG. 15B, a dot area DA may be divided into a plurality of areas. For example, a dot area DA may be divided into a first P1 to third area P3. The first dots DT1 to third dots DT3 contained in the first P1 to third area P3 may have different attributes. For example, the second dots DT2 may be larger than the first dots DT1 while the third dots DT3 may be larger than the second dots DT2. Alternatively, although sizes of the first DT1 to third dots DT3 are the same to one another, density of dots within the first area P1 may be different from the density within the second area P2, and the density within the second area P2 may be different from the density within the third area P3. For example, the density within the first area P1 may be greater than the density within the second area P2, and the density within the second area P2 may be greater than the density within the third area P3.

Figure 16:
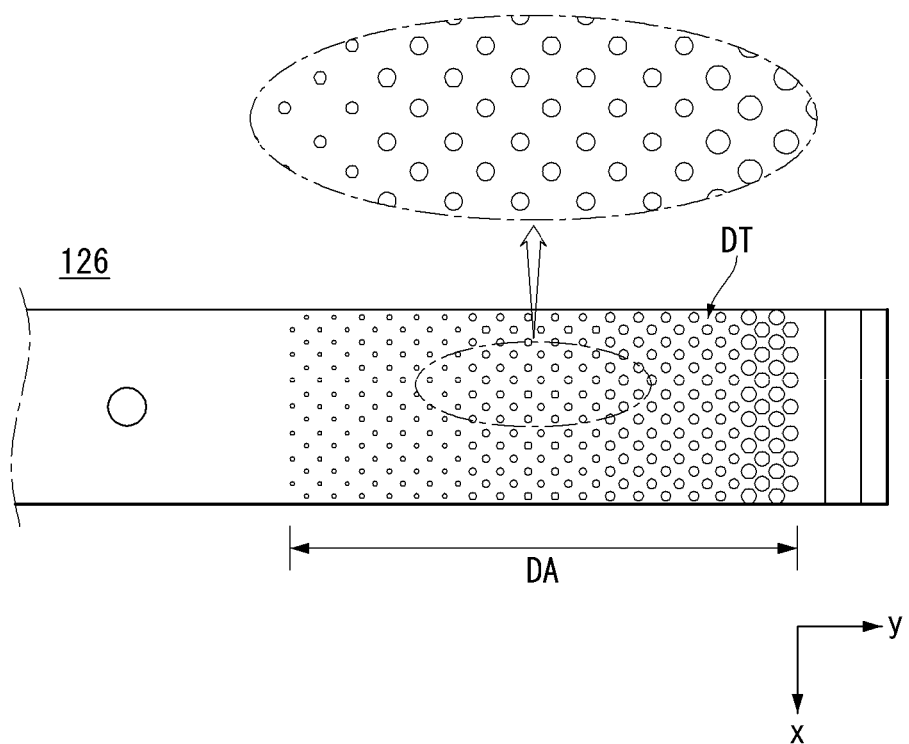

As shown in FIG. 16, a dot area DA may not be clearly divided into a plurality of areas. However, at least one of the size, density, and color of the dots DT contained in the dot area DA may be different from one another. For example, size of dots DT may be increased gradually along the Y-axis direction. In other words, attributes of the dots DT including at least one of the size, density, and color may change gradually.

Figure 17A:
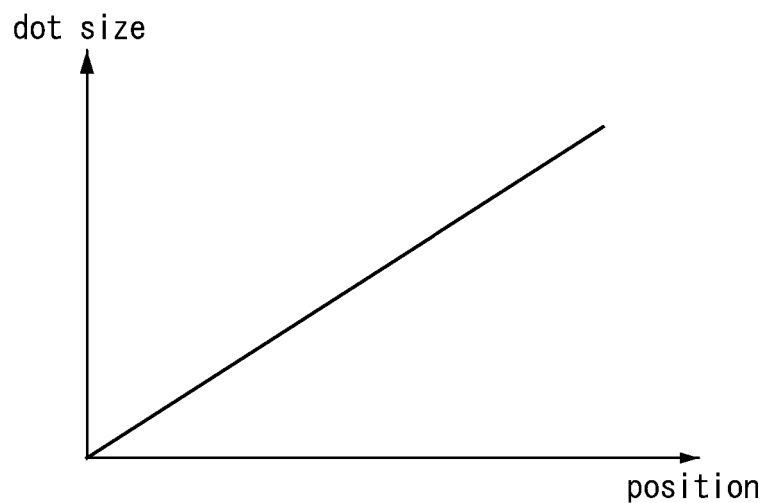
Figure 17B:
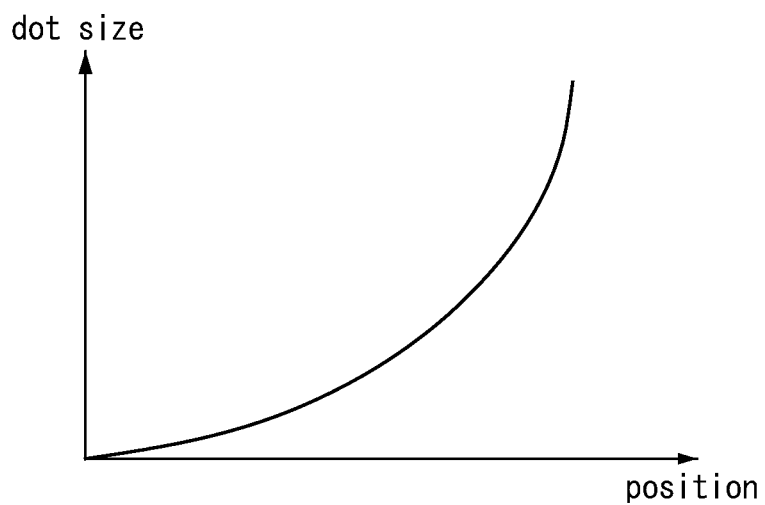

As shown in FIG. 17A, the size of the dots DT may change gradually according to their position. That is, the change in size may be linear relative to position. As shown in FIG. 17B, the size of the dots DT may change rapidly according to their position. For example, the dot size may change in the form of a second-order curve function.

FIGS. 18 to 22B illustrate an assembling relationship between a reflecting sheet and a peripheral structure according to one embodiment of the present disclosure.

Figure 18:
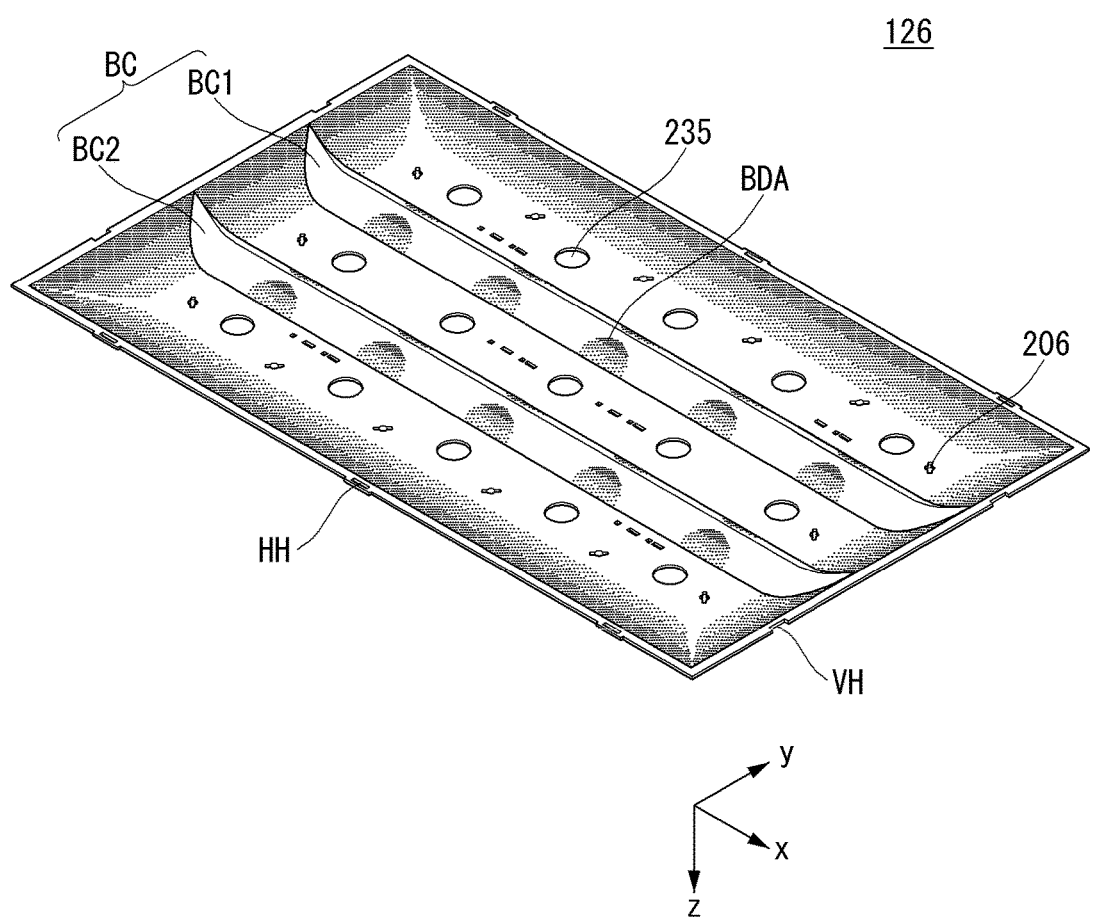
FIGS. 18 to 22B illustrate an assembling relationship between a reflecting sheet and a peripheral structure according to one embodiment of the present disclosure.

As shown in FIG. 18, the reflecting sheet 126 may protrude not only from the second sheet area 126b (FIG. 11) described above but also from other parts thereof. The reflecting sheet 126 may have a three-dimensional shape not only in the second sheet area 126b (FIG. 11) described above but also in other parts of the reflecting sheet 126.

For example, a chamfer area BC may be formed between at least one lens hole 235 and another neighboring lens hole 235 separated in the Y-direction by a predetermined distance in the reflecting sheet 126. The chamfer area BC may be formed in a shape that extends in the X-direction. One surface of the chamfer area BC may protrude being inclined in an oblique direction with respect to the Z-direction. Accordingly, seen from the side surface, the chamfer area BC may appear as a protrusion of a triangular pillar constructed such that both sides of the chamfer area meet at one point. In other words, the chamfer area BC may be shaped to protrude toward the front surface more than the first sheet area 126a, similar to the second sheet area 126b. The chamfer area BC may be referred to herein as a protrusion.

At least one or more chamfer areas BC may be included within the reflecting sheet 126. As shown in the figure, when the lens holes 235 are formed in three lines as shown, the chamfer area BC may include a first chamfer area BC1 and a second chamfer area BC2. It should be appreciated that greater number of chamfer areas may be provided if a greater number of rows of lens holes 235 are provided.

A chamfer dot area BDA may be formed on at least one part of the chamfer area BC. The chamfer dot area BDA may be a part of the chamfer area BC that includes a plurality of dots. The chamfer dot area BDA may have a similar shape and effect as the dot area DA of FIG. 13.

The chamfer dot area BDA may be located at a position corresponding to the lens hole 235. In other words, each chamfer dot area BDA may be separated from another neighboring chamfer dot area BDA by a predetermined distance. The chamfer dot area BDA may be formed in the shape of a semi-circle. Accordingly, width of the chamfer dot area BDA in the X-direction may be decreased toward the upper part.

The reflecting sheet 126 having a chamfer area BC in the display device as described above may allow light to be reflected more uniformly from the reflecting sheet 126.

Figure 19:
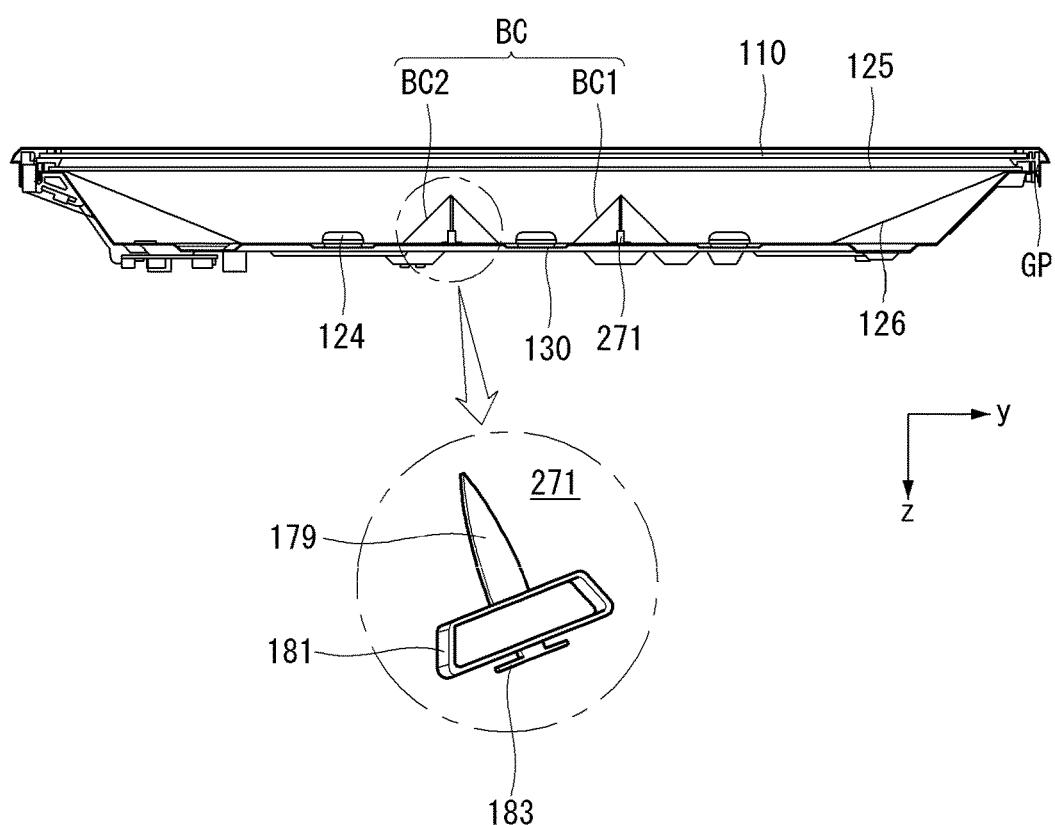

As shown in FIG. 19, a holder 271 may support the central part of the chamfer area BC. In other words, the central part of the chamfer area BC may be pushed toward the upper part (in the Z-axis direction) by one end of the holder 271.

The holder 271 may include a pin 179, an elastic part 181, and a fastening part 183. The pin 179 may be located at one end of the holder 271. The pin 179 may be formed to have a protruding shape. The pin 179 may be tapered toward the upper part. Accordingly, forces are concentrated at one end of the pin 179 to support the reflecting sheet 126 more firmly. The end of the pin 179 may be shaped to be flat rather than sharp. Accordingly, when the pin 179 pushes the central part of the chamfer area BC, a crack may be prevented from forming on the reflecting sheet 126.

The elastic part 181 may be located in the lower part of the pin 179. The elastic part 181 may be in the form of, for example, a rectangular frame with a hollow center. The elastic part 181 may absorb the forces applied when the holder 271 supports the reflecting sheet 126. In other words, an external force exerted by the pin 179 may be absorbed as the width of the elastic part 181 is reduced. Accordingly, the holder 271 may not be easily broken due to the elastic part 181.

The fastening part 183 may be located in the lower part of the elastic part 181. The fastening part 183 may fasten the holder 271 to the frame 130. In other words, the fastening part 183 may be the part through which the holder 271 is inserted into the frame 130.

In the display device according to one embodiment of the present disclosure as described above, the holder 271 may be provided to form a chamfer area BC of the reflecting sheet 126. Accordingly, costs to fabricate the chamfer area BC may be saved.

Figure 20A:
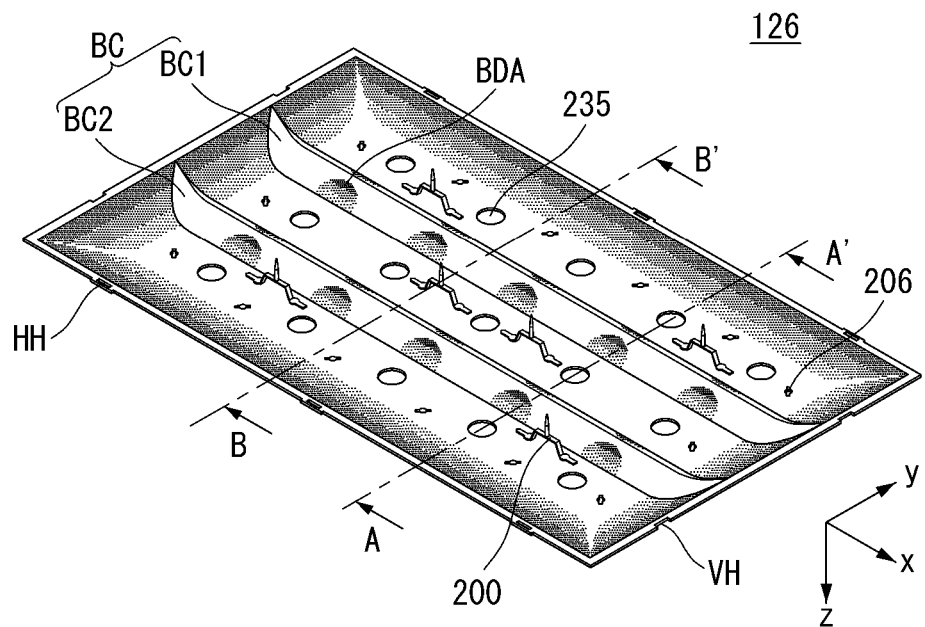

As shown in FIG. 20A, a supporter 200 may be disposed on the reflecting sheet 126. For example, at least part of supporters 200 may be disposed between the lens holes 235, and at least the remaining part of the supporters 200 may be disposed adjacent to the chamfer area BC.

However, the present disclosure is not limited to the description above, and the supporter 200 may be disposed in various ways. For example, the number of supporters 200 disposed in a specific row may be different from that in the next row. Similarly, the number of supporters 200 disposed in a specific column may be different from that in the next column.

The supporter 200 may be made of a soft material such as rubber and silicon. At least part of the supporter 200 may be made of plastic material. For example, the supporter 200 may be shaped by using a plastic material and then by applying a soft material such as rubber thereon.

The supporter 200 may be arranged at regular intervals at the optical sheet 125 and provided on the front surface of the reflecting sheet 126. In other words, the supporter 200 may support a diffusion plate located on the rear surface within the optical sheet 125.

Figure 20B:
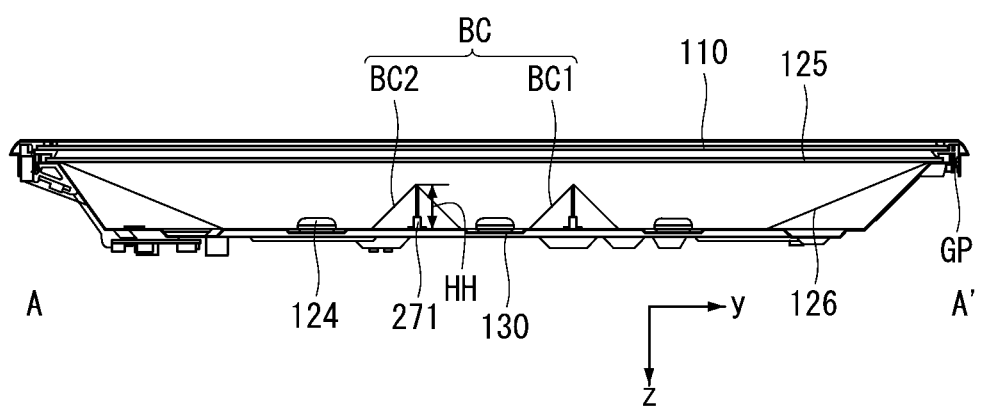
Figure 20C:
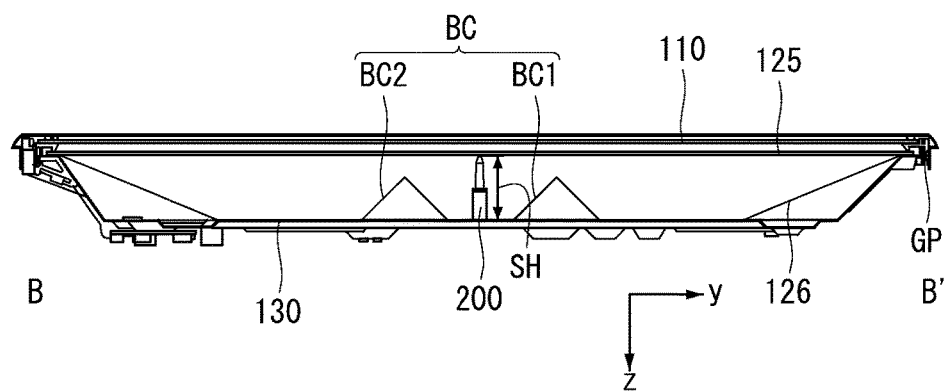

FIG. 20B illustrates holders 271 located along the A-A' line of the reflecting sheet 126, and FIG. 20C illustrates supporters 200 may be located along the B-B' line of the reflecting sheet 126. The holders 271 and the supporters 200 may be located at different rows and/or columns. However, the present disclosure is not limited to the description above, and the holder 271 and the supporter 200 may be located in the same line.

A height of the holder 271 may be different from a height of the supporter 200. For example, height HH of the holder 271 may be lower than the height SH of the supporter 200. In case the height HH of the holder 271 is higher than the height SH of the supporter 200, the chamfer area BC may come into contact with the optical sheet 125, and a crack may be formed in the optical sheet 125. The holder 271 and the supporter 200 may be coupled to the frame 130.

The chamfer area BC may be lower than the height of the supporter 200. In other words, the chamfer area BC may not make contact with the optical sheet 125. The chamfer area BC may be separated from the optical sheet 125 by a predetermined distance by the supporter 200. If the chamfer area BC is separated from the optical sheet 125, unbalance of brightness due to the chamfer area BC may be minimized. A chamfer dot area BDA may be formed in the chamfer area BC according to one embodiment of the present disclosure. Therefore, possibility of imbalance in brightness due to the chamfer area BC may be reduced. It should be appreciated that the chamfer dot area BDA is not limited to a dot pattern, but may be a hole or stripe pattern and/or a combination thereof.

Figure 21:
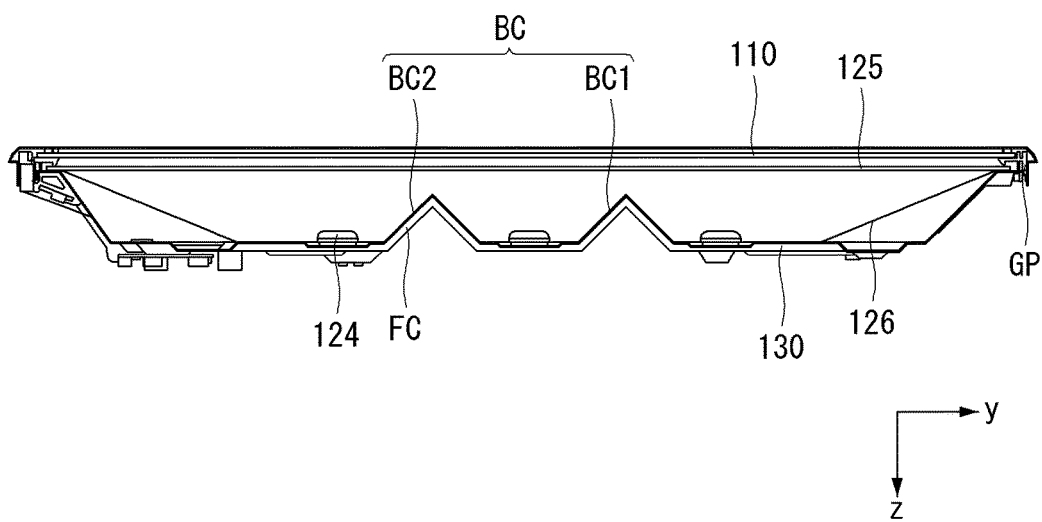

As shown in FIG. 21, the frame 130 may include a bending area FC at the part corresponding to the chamfer area BC. The bending area FC may be formed in a shape protruding in the upward direction in the same way as the chamfer area BC. In other words, the bending area FC may be inclined in an oblique direction with respect to the Z-direction at the same angle as the chamfer area BC.

Different from the holder 271 of FIG. 19 described above, the bending area FC may support the whole chamfer area BC. Accordingly, since forces are not concentrated on the central part of the chamfer area BC, formation of cracks may further be prevented. Also, as a plurality of bending areas FC may be located on the frame 130, rigidity of the frame 130 may be improved.

Figure 22A:
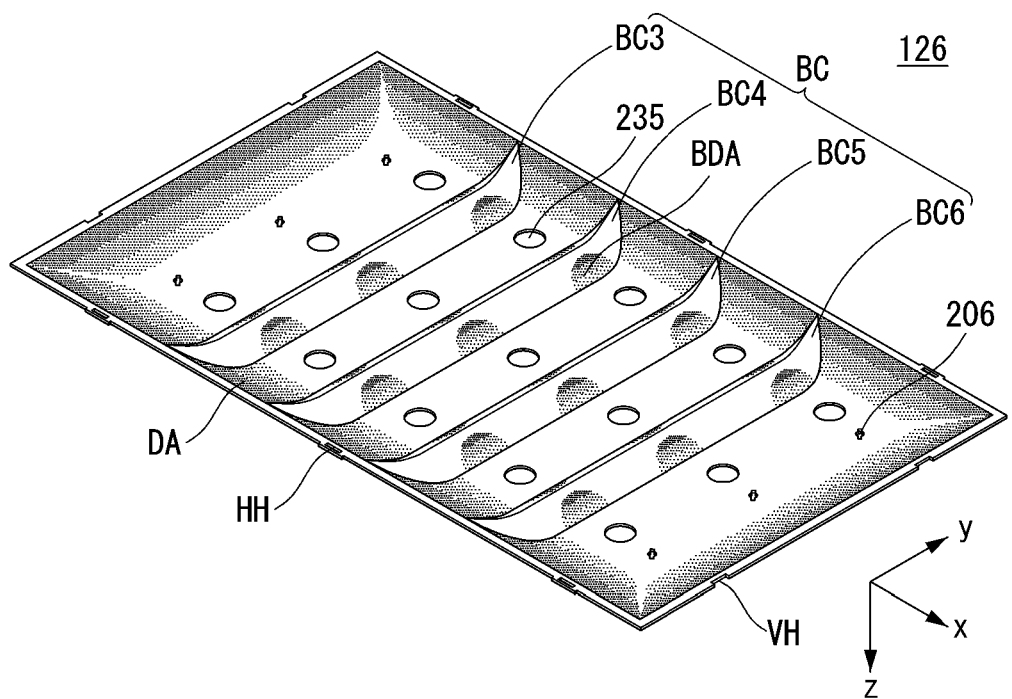

As shown in FIG. 22A, the chamfer area BC may be formed between at least one lens hole 235 and another neighboring lens hole 235 and separated in the X-direction by a predetermined distance. The chamfer area BC may be formed in a shape extended in the Y-direction.

As shown in FIG. 22A, when the lens holes 235 are formed in five lines separated in the X-direction, the chamfer area BC may include a third chamfer area BC3 to a sixth chamfer area BC6. However, the present invention is not limited to the specific example, and if the lens holes 235 are formed in more lines in the X-direction, a larger number of chamfer areas BC may be provided.

Since the chamfer area BC is extended in the Y-direction rather than the X-direction, a larger number of chamfer areas BC may be formed. Accordingly, light may be reflected more uniformly from the reflecting sheet 126.

Figure 22B:
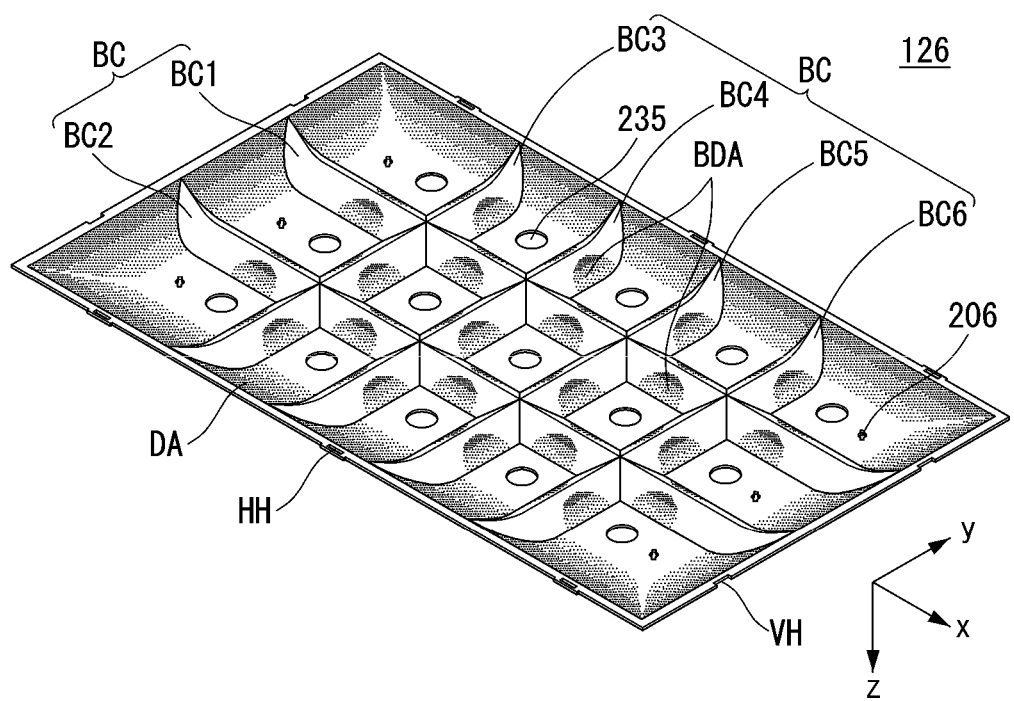

As shown in FIG. 22B, the chamfer area BC may include all of the first chamfer area BC1 and the second chamfer area BC2 extended in the X-direction, and the third chamfer area BC3 to the sixth chamfer area BC6 extended in the Y-direction.

In this case, the light emitted sideways from four sides of the lens may be reflected by the chamfer area BC or the second sheet area 126*c* of FIG. 11. Accordingly, areas on which light is concentrated may be prevented. Also, reflectance of the light emitted sideways from the four sides of the lens may be adjusted by the chamfer dot area BDA or dot area DA. Accordingly light may be reflected more uniformly from the reflecting sheet 126.

Figure 24:
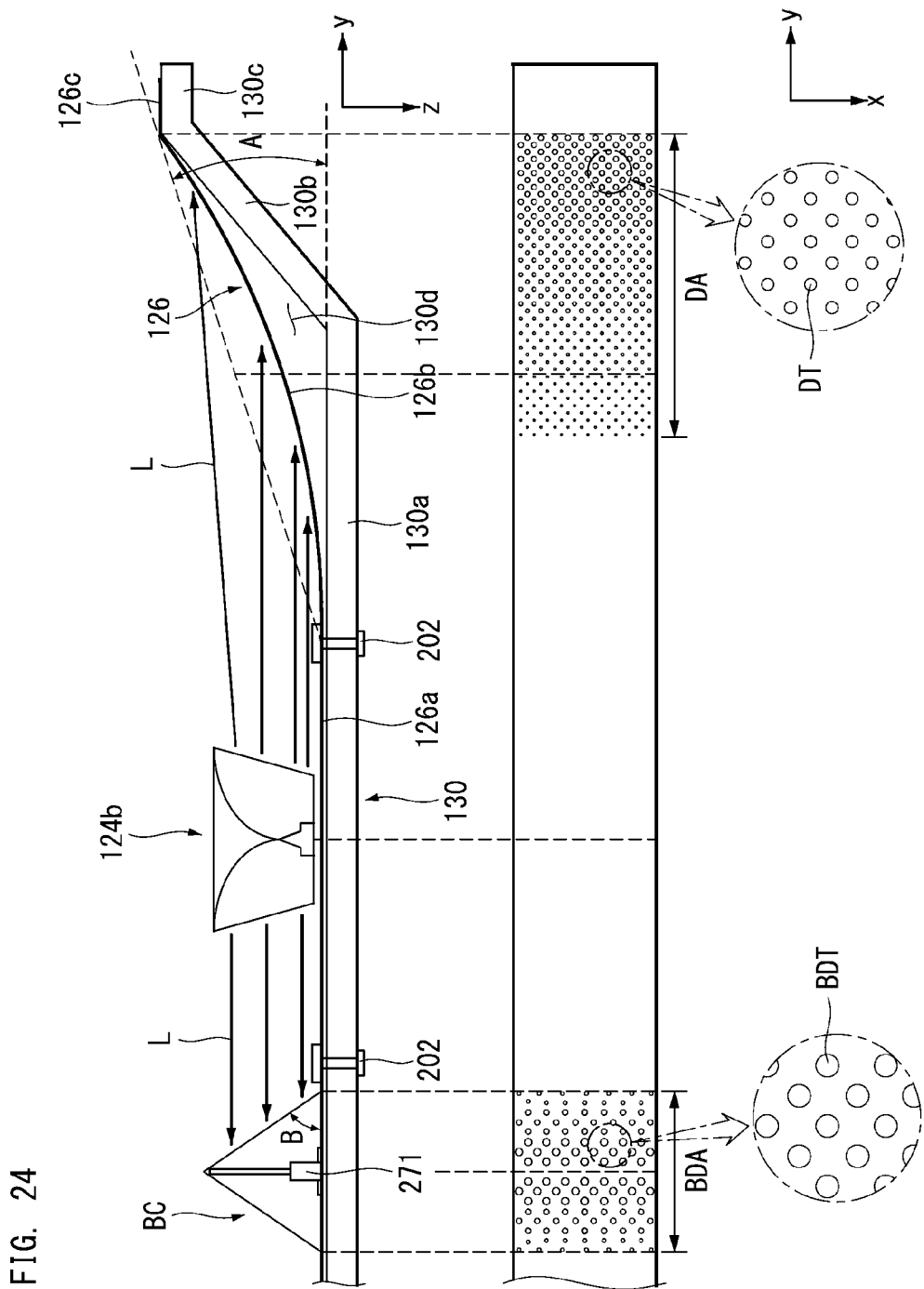
Figure 25:
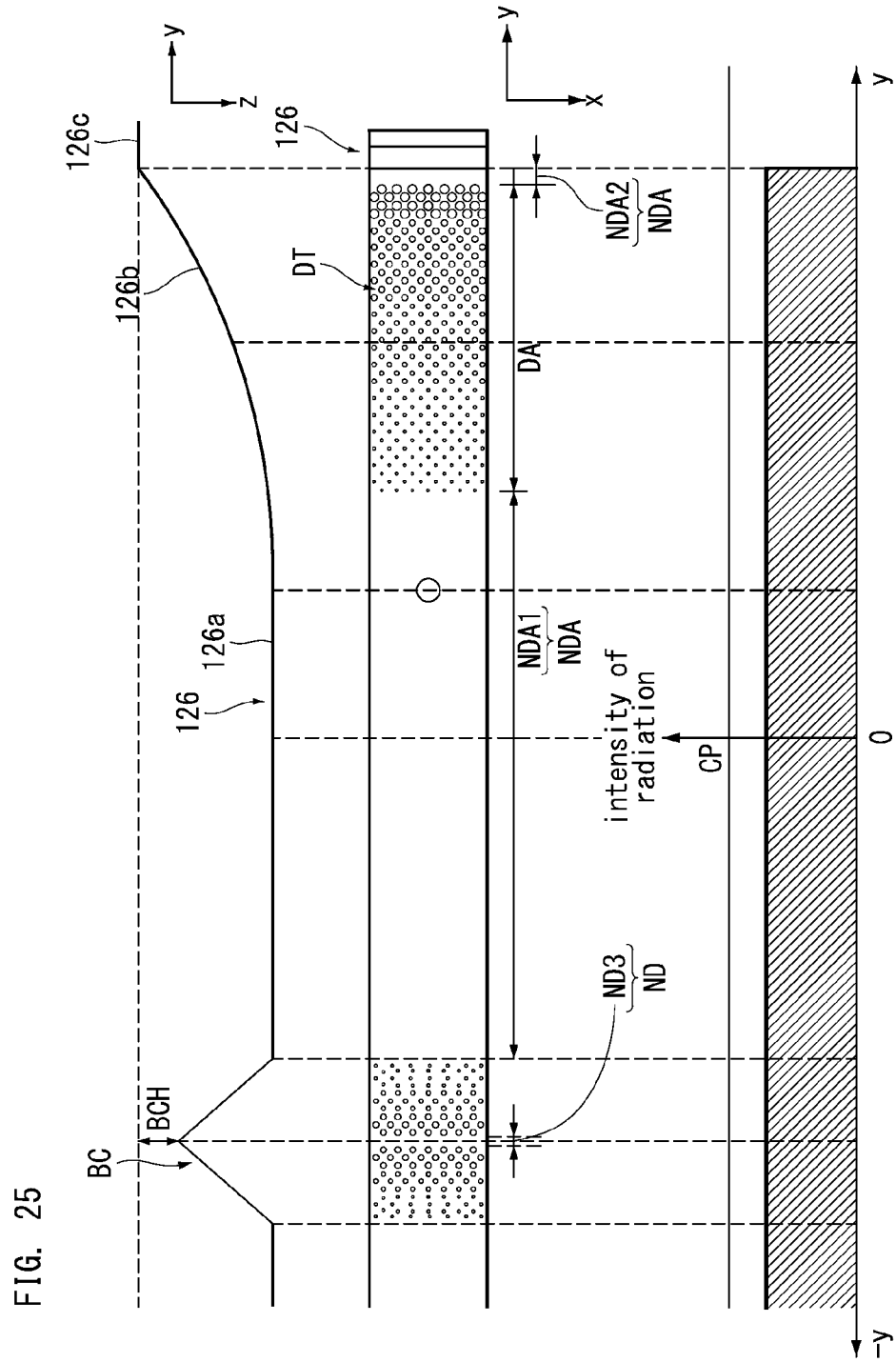

FIGS. 23 to 25 illustrate a structure of a reflecting sheet according to another embodiment of the present disclosure. As shown in FIG. 23, the angle formed between one surface of the chamfer area BC and the bottom surface of the frame 130 along the Y-direction is denoted as B. The angle B may be greater than angle A formed between the extension line, starting from the boundary between the first sheet area 126*a* and the outer boundary area of the second sheet area 126*b* to the boundary between the outer boundary area of the second sheet area 126*b* and the third sheet area 126*c*, and the line parallel to the X-direction. Also, the angle B may be greater than the angle between a tangent line of at least one part of the second sheet area 126*b* and the line parallel to the X-direction (e.g., FIG. 12). In other words, the angle B may be greater than any other part of the outer area of the second sheet area 126*b*.

The light L from the sides of the lens 124*b* incident on one surface of the chamfer area BC may not be uniform in terms of the amount and/or density of light as described with respect to FIG. 11. For example, more light L may be incident on the upper area of the chamfer area BC than the lower area. Since the angle B of the chamfer area BC is greater than the angle A of the outer area of the second sheet area 126*b*, non-uniformity of light L may be more severe in the chamfer area BC. This non-uniform distribution of light L at the chamfer area BC may be addressed based on dots as described below.

The fixing pin 202 may be disposed to be adjacent to the chamfer area BC. For example, the fixing ping 202 may be disposed in the boundary between the chamfer area BC and the first sheet area 126*a*. The fixing pin 202 may prevent the reflecting sheet 126 from being raised due to the chamfer area BC.

As shown in FIG. 24, the chamfer dot area BDA of the chamfer area BC may be smaller than the dot area DA of the outer area of the second sheet area 126*b*. Also, as described above, because of the difference between the angle B and A of FIG. 22, non-uniformity of light L in the chamfer area BC may be more severe than the non-uniformity of light L in the outer area of the second sheet area 126*b*. Accordingly, the diameter of the chamfer dots BDT located within the chamfer dot area BDA may be larger than the diameter of dots DT located within the dot area DA.

However, the present invention is not limited to the description above, and the reflectance of the chamfer dot area BDA may be made lower than the reflectance of the dot area DA by varying at least one of the shape, position, and color of the chamfer dot BDT located within the chamfer dot area BDA.

With reference to FIG. 25, a third non-dot area NDA3 may be located in the chamfer area BC. The third non-dot area NDA3 may be located in the part adjacent to the edge of the chamfer area BC. The third non-dot area NDA3 may be formed in the top-most area of the chamfer area BC, thus, it may be located closely to the front optical sheet and/or diffusion plate. Therefore, chamfer dots BDT used in the third non-dot area NDA3 may be visible to the user. Therefore, the third non-dot area NDA3 may not contain chamfer dots BDT.

The chamfer area BC may be formed to be lower than the third sheet area 126c. In other words, an edge (tip or top edge) of the chamfer area BC may be lower than the third sheet area 126c by a predetermined distance BCH. Accordingly, the chamfer area BC may be located farther from the optical sheet and/or diffusion plate than the outer area of the second sheet area 126b adjacent to the third sheet area 126c. Accordingly, the third non-dot area NDA3 located at the part close to the edge of the chamfer area BC may be smaller than the area of the second non-dot area NDA2.

Since the edge of the chamfer area BC is separated from the optical sheet and/or diffusion plate by a predetermined distance BCH, this may ensure that the user is not able to see the shape of the chamfer dots BDT even if the area of the third non-dot area NDA3 is small.

Figure 26:
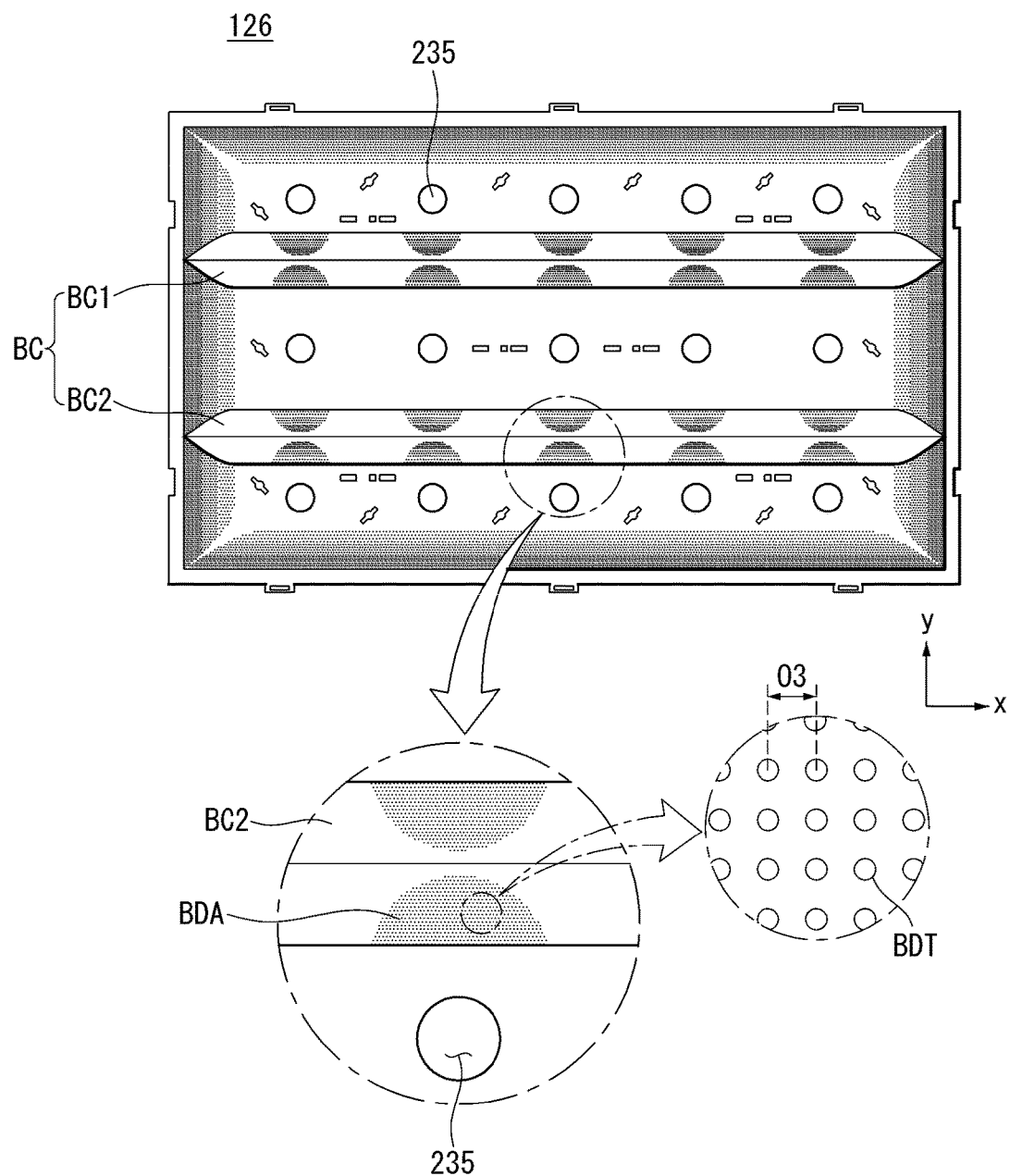
FIGS. 26 to 30 illustrate a distribution of dots of a reflecting sheet according to another embodiment of the present disclosure.

FIGS. 26 to 30 illustrate a distribution of dots of a reflecting sheet according to another embodiment of the present disclosure. As shown in FIG. 26, chamfer dots BDT may be disposed inside the chamfer dot area BDA. Neighboring chamfer dots BDT may be separated from each other by a third distance O3. In other words, the chamfer dots BDT may be disposed at regular intervals. The spacing between chamfer dots BDT may influence reflectance. For example, if the chamfer dots BDT are tightly spaced, reflectance may be lowered.

The third distance O3 may be smaller than the first distance O1 of FIG. 14. Therefore, reflectance per unit area of the chamfer dot area BDA may be smaller than the reflectance per unit area of the dot area DA of FIG. 14.

Figure 27:
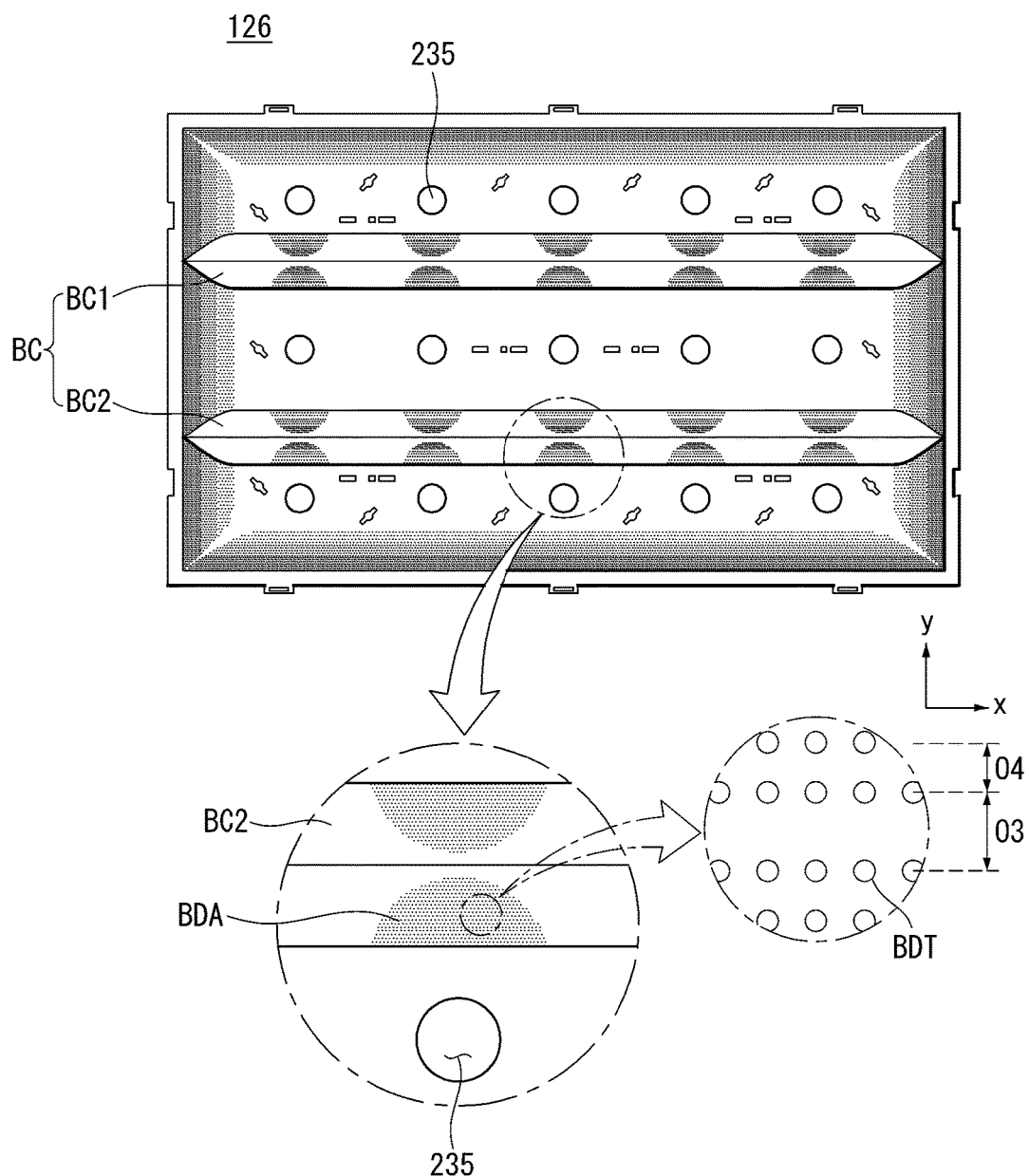

As shown in FIG. 27, for some cases, neighboring chamfer dots BDT may be separated by the third distance O3 while they may be separated by a fourth distance O4 for other cases. In other words, the spacing between chamfer dots may be varied. Light may be controlled to be uniform by adjusting the spacing between chamfer dots BDT according to the amount and/or density of light incident on the chamfer dot area BDA.

Figure 28:
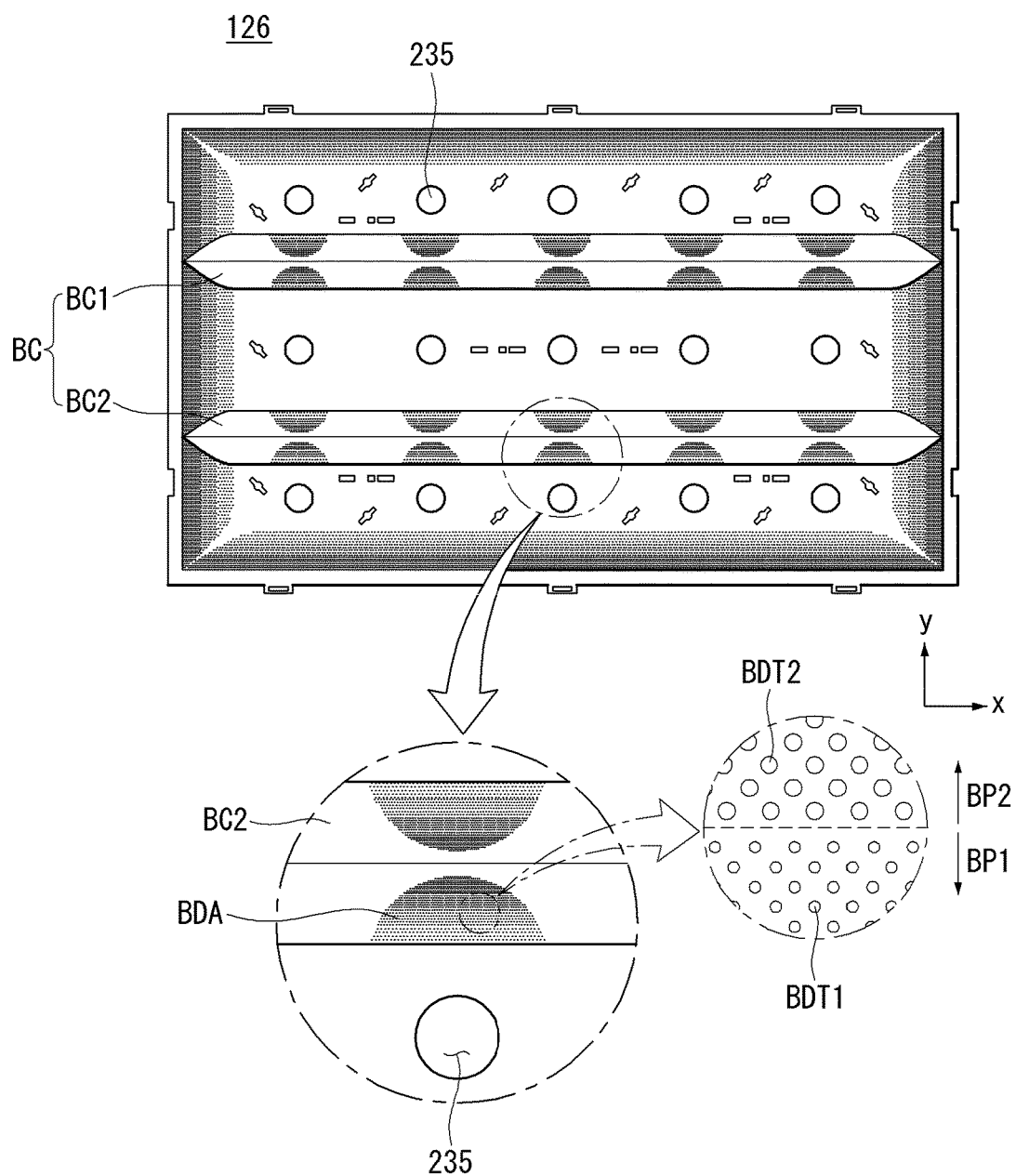

As shown in FIG. 28, the chamfer dot area BDA may be divided into a plurality of areas. For example, the chamfer dot area BDA may be divided into a first inclination area BP1 and a second inclination area BP2. The chamfer dots BDT contained in the first inclination area BP1 and the second inclination area BP2 may have attributes different from each other. For example, size of the first chamfer dot BDT1 of the first inclination area BP1 and at least one of size, density, and color of the second chamfer dot BDT2 of the second inclination area BP2 may be different from each other.

The second inclination area BP2 may be closer to the edge of the chamfer area BC than the first inclination area BP1. For example, the second inclination area BP2 may be located above the first inclination area BP1 in the chamfer dot area BDA. The second chamfer dot BDT2 of the second inclination area BP2 may be larger than the first chamfer dots BDT1 of the first inclination area BP1. Therefore, reflectance of the second inclination area BP2 may be smaller than that of the first inclination area BP1.

Although FIG. 28 illustrates the chamfer dot area BDA as being divided into two areas, the present disclosure is not limited thereto, and the chamfer dot area BDA may be divided into more areas.

The size of the second chamfer dot BDT2 may be smaller than the size of the second dot DT2 of FIG. 15, and the size of the first chamfer dot BDT1 may be larger than the size of the first dot DT1 of FIG. 15. However, the present disclosure is not limited thereto, and it may be possible, for example, that only the second chamfer dot BDT2 is larger than the second dot DT2 or only the first chamfer dot BDT1 is larger than the first dot DT1. Accordingly, reflectance per unit area of the chamfer dot area BDA may be smaller than the reflectance per unit area of the dot area DA of FIG. 15.

Figure 29:
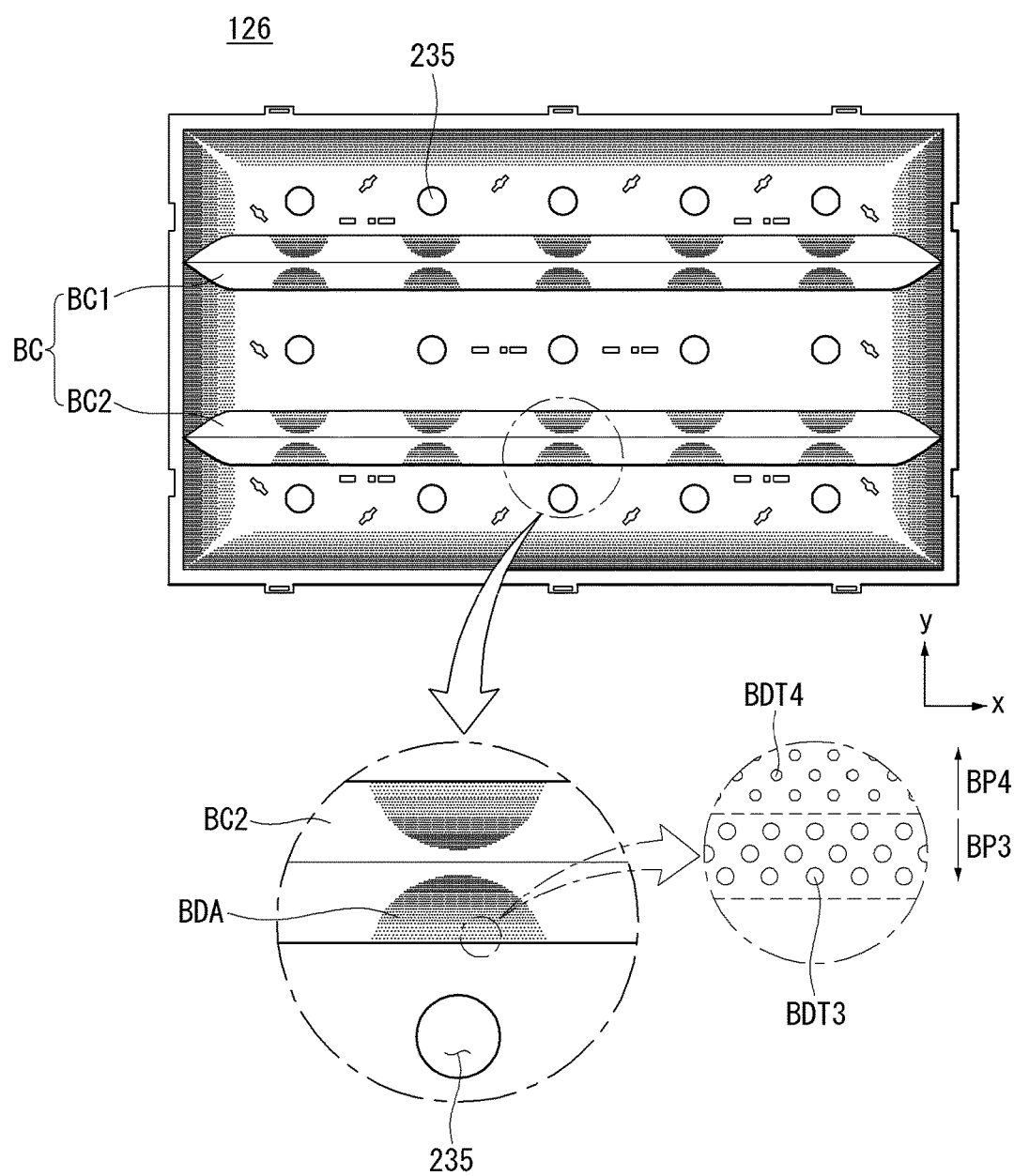

As shown in FIG. 29, the chamfer dot area BDA may be divided into a plurality of areas. For example, the chamfer dot area BDA may be divided into a third inclination area BP3 and a fourth inclination area BP4. The chamfer dots BDT contained in the third inclination area BP3 and the fourth inclination area BP4 may have attributes different from each other. For example, size of the third chamfer dot BDT3 of the third inclination area BP3 and at least one of size, density, and color of the fourth chamfer dot BDT4 of the fourth inclination area BP4 may be different from each other.

The third inclination area BP3 may be the area closest to the part other than the chamfer area BC of the reflecting sheet 126. In other words, the third inclination area BP3 may be the part at which the chamfer area BC is started. The fourth chamfer dot BDT4 of the fourth inclination area BP4 may be smaller than the third chamfer dot BDT3 of the third inclination area BP3. Therefore, reflectance of the third inclination area BP3 may be smaller than the reflectance of the fourth inclination area BP4.

Due to the light reflected from the bottom area of the reflecting sheet 126 adjacent to the chamfer area BC, the amount and/or density of light incident on the third inclination area BP3 may be larger than the amount and/or density of light incident on the fourth inclination area BP4. Accordingly, by making the fourth chamfer dot BD4 smaller than the third chamfer dot BDT3, the amount and/or density of incident light may be controlled to be uniform.

Figure 30:
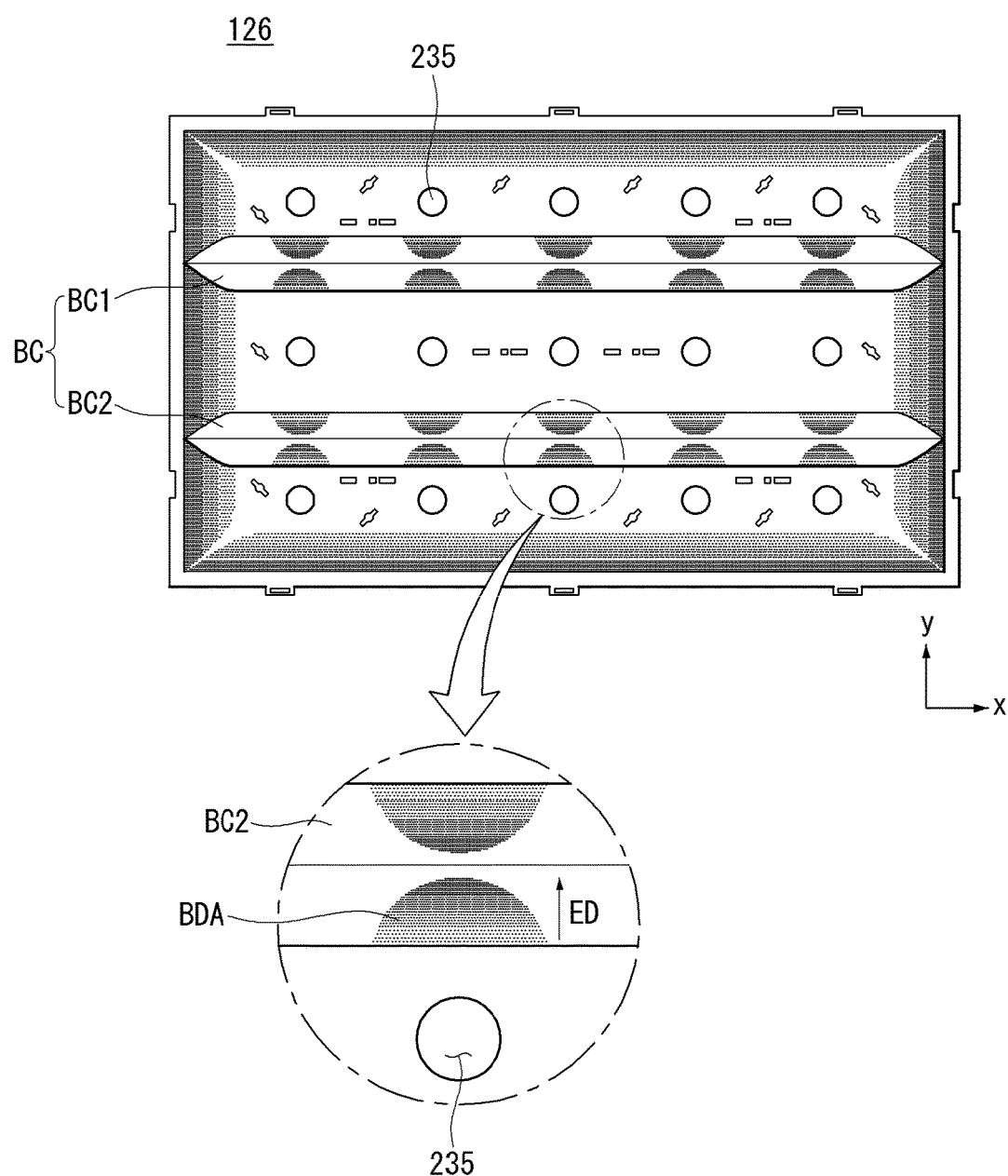

As shown in FIG. 30, the chamfer dot area BDA may not be divided clearly into a plurality of areas. However, it should be noted that at least one of the size, density, and color of the chamfer dot contained in the chamfer dot area BDA may be different. For example, an attribute other than the size of the chamfer dot may be changed gradually in the edge direction ED of the chamfer area BC. In other words, the attribute of the chamfer dot including at least one of size, density, and color may change gradually.

Figure 31:
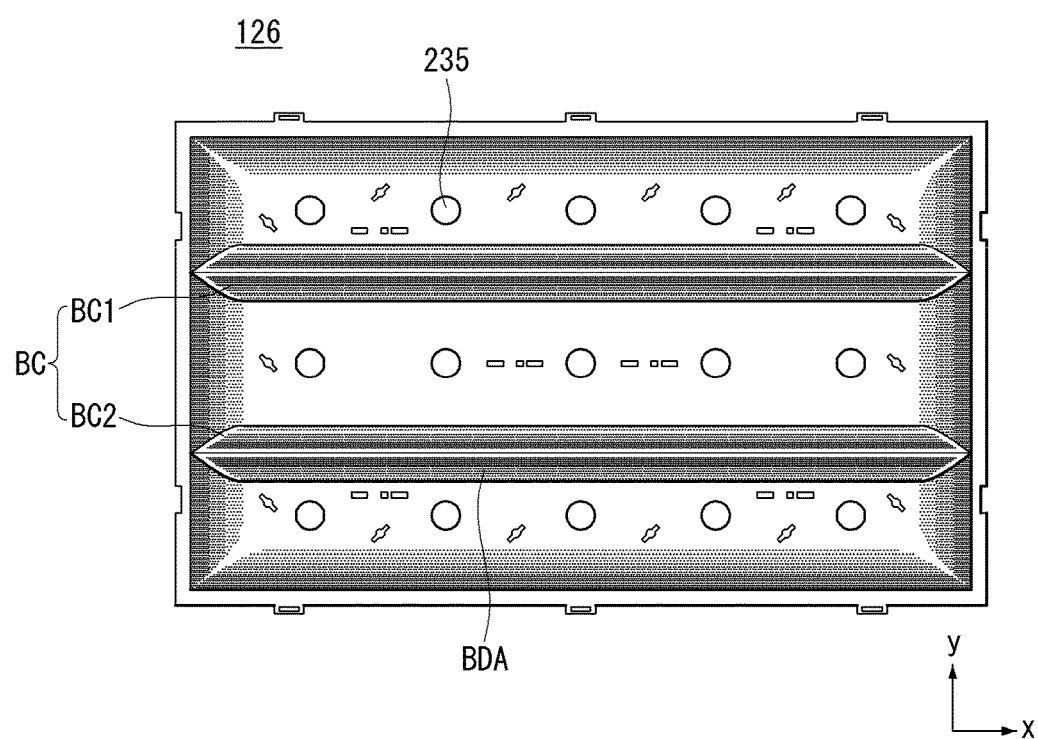
FIGS. 31 to 35B illustrates a structure of a reflecting sheet according to another embodiment of the present disclosure.

FIGS. 31 to 35B illustrates a structure of a reflecting sheet according to another embodiment of the present disclosure. As shown in FIG. 31, the chamfer dot area BDA may be located over the whole chamfer area BC. In other words, chamfer dots may be distributed across the whole chamfer areas BC1 and BC2. Chamfer dots may be distributed over the entire included surfaces of both of the chamfer areas BC1 and BC2.

As described above, according to the amount and/or density of incident light, at least one of size, shape, position, and color of the chamfer dot may change. For example, size (or another attribute) of the chamfer dot may be increased gradually toward the edge of the chamfer area BC.

In this case, the chamfer dot area BDA may be located at other parts in addition to the part corresponding to the lens hole 235. Accordingly, the amount and/or density of light incident on other parts rather than the part corresponding to the lens hole 235 may be adjusted. Therefore, the light reflected from the reflecting sheet 126 may be made more uniform.

Figure 32:
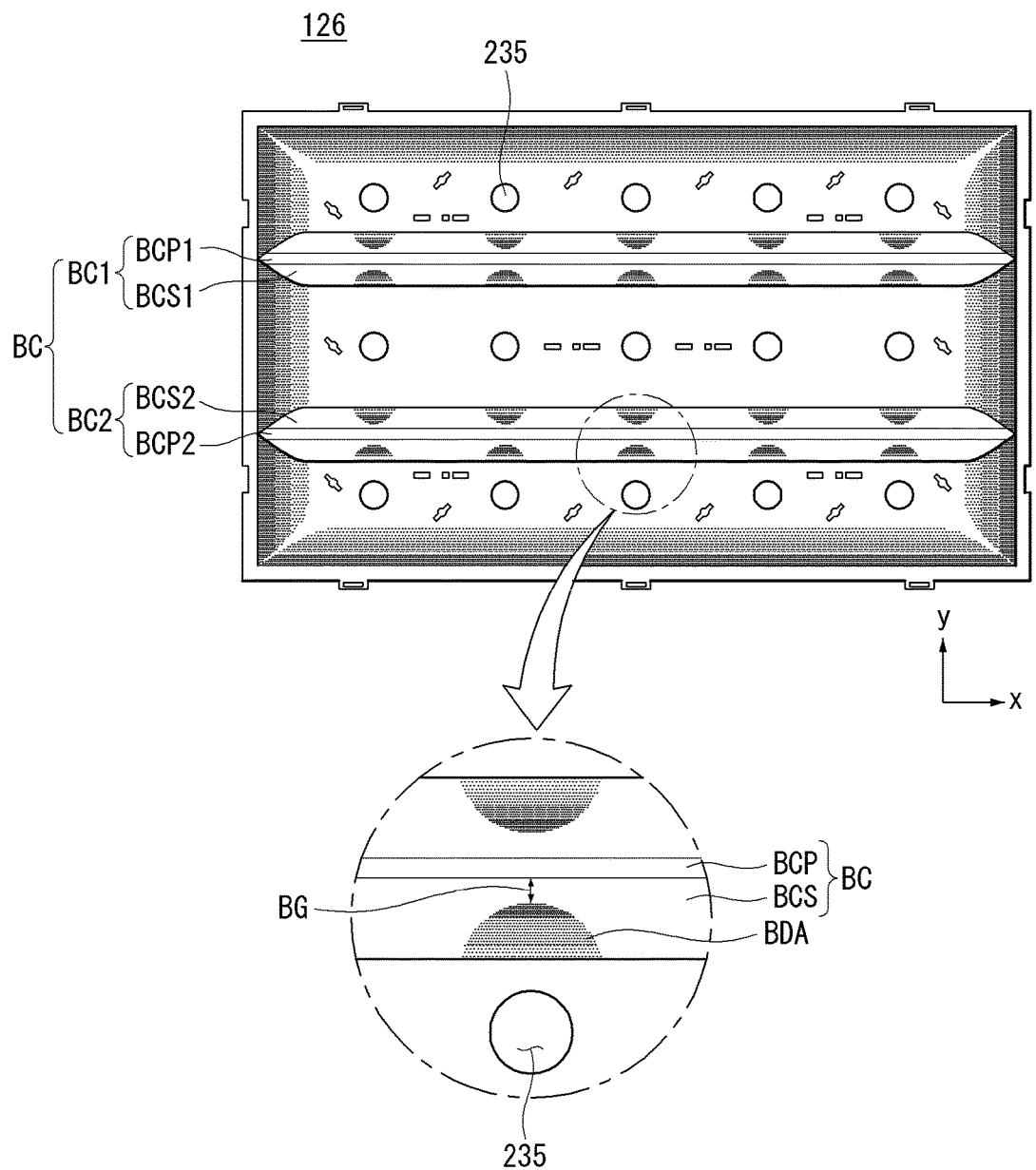

As shown in FIG. 32, the chamfer area BC may include a chamfer flat area BCP and a chamfer inclination area BCS. The chamfer inclination area BCS may denote the area inclined in an oblique direction with respect to the Z-direction. The chamfer inclination area BCS may be located at both ends of the chamfer area BD in the Y-direction. The chamfer inclination area BCS may correspond to the part at which the chamfer dot area BDA is located.

The chamfer flat area BCP may be the part extending from the chamfer inclination area BCS. In other words, the chamfer flat area BCP may be the plane connecting both of the chamfer inclination areas BCS. The chamfer flat area BCP may be the plane located on the X-Y plane. The chamfer dot area BDA may not be located on the chamfer flat area BCP. Since the chamfer flat area BCP is adjacent to the optical sheet and/or diffusion plate, the user may be able to see the chamfer dot, and hence, the chamfer dot area BDA may not be located on the chamfer flat area BCP.

The chamfer dot area BDA may be separated from the chamfer flat area BCP by a predetermined distance BG. Since the part close to the chamfer flat area BCP is adjacent to the optical sheet and/or diffusion plate, a chamfer dot in this region may be visible to the user. Therefore, the chamfer dot area BDA may be separated from the chamfer flat area BCP.

Figure 33A:
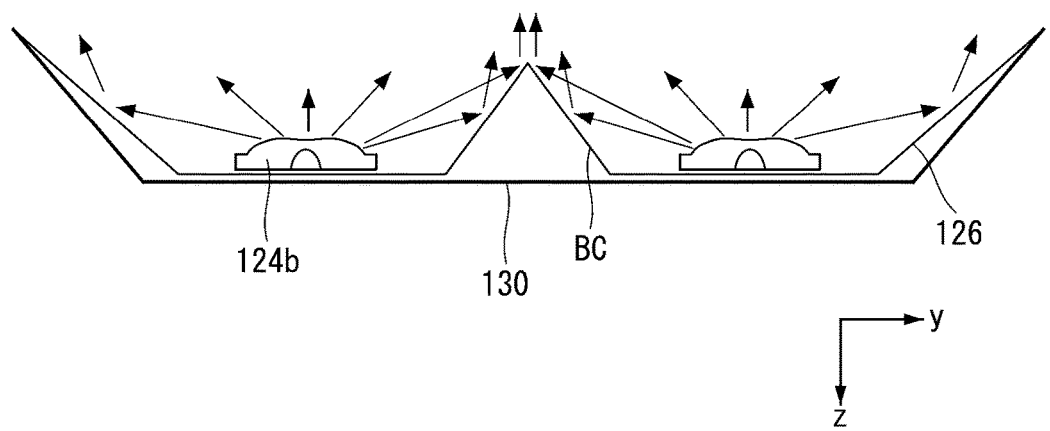

As shown in FIG. 33A, the light L from the sides of the lens 124*b* may not be uniform. Accordingly, light may be reflected intensely toward the center of the chamfer area BC in the absence of the chamfer flat area BCP. Therefore, when watching the display screen, bright or dark spots formed on the screen by the concentration of light may be distracting to a user.

Figure 33B:
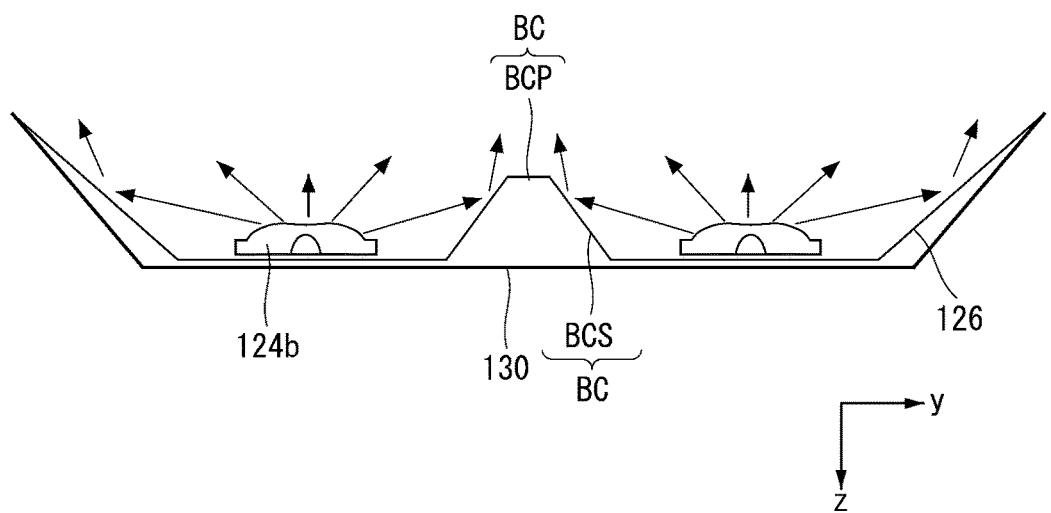

Different from the case above, FIG. 33B shows that, in the presence of the chamfer flat area BCP, abundant and condensed light from the upper area is allowed to pass, and the light may not be reflected as intensely toward the center of the chamfer area BC. Therefore, the user may watch the display screen with uniform brightness.

Figure 34:
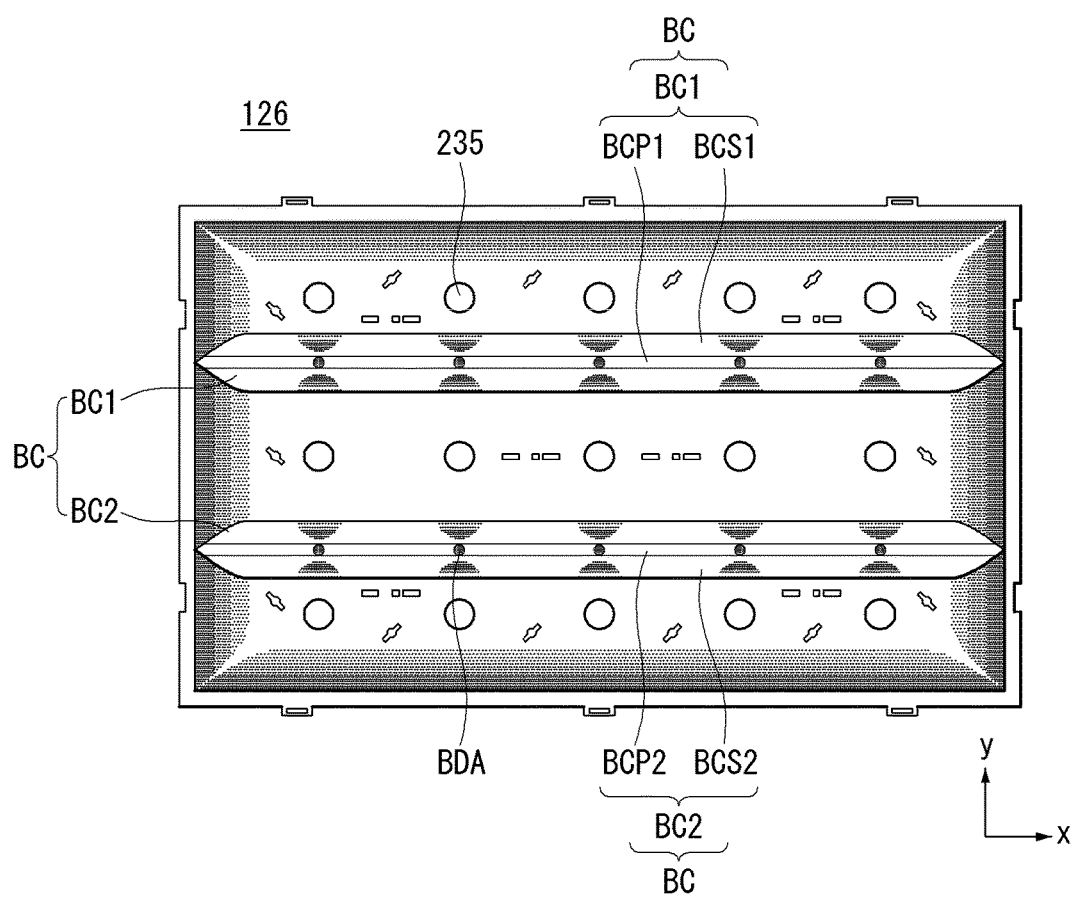

As shown in FIG. 34, the chamfer dot area BDA may be located in at least one part of the chamfer flat area BCP. The chamfer dot area BDA of the chamfer flat area BCP may be located at the part corresponding to the lens hole 235. For example, the chamfer dot area BDA of the chamfer flat area BCP may be located at the part extended from the lens hole 235 in the Y-direction.

Previously described with reference to FIG. 25, since the chamfer area BC is lower than the third sheet area 126*c*, even if the chamfer dot area BDA is located in the chamfer flat area BCP, the user may not be able to see the shape of the chamfer dot. The chamfer dot area BDA of the chamfer flat area BCP may adjust the reflectance of light reflected from the optical sheet and/or diffusion plate located in the upper part of the reflecting sheet 216.

Since the amount and/or density of light toward the upper area is higher than that toward the chamfer area BC, the amount and/or density of light reflected from the optical sheet and/or diffusion plate reflected toward the chamfer flat area BCP may be high. Accordingly, by forming the chamfer dot area BDA on the chamfer flat area BCP, the light from the reflecting sheet 126 may be reflected more uniformly.

Figure 35A:
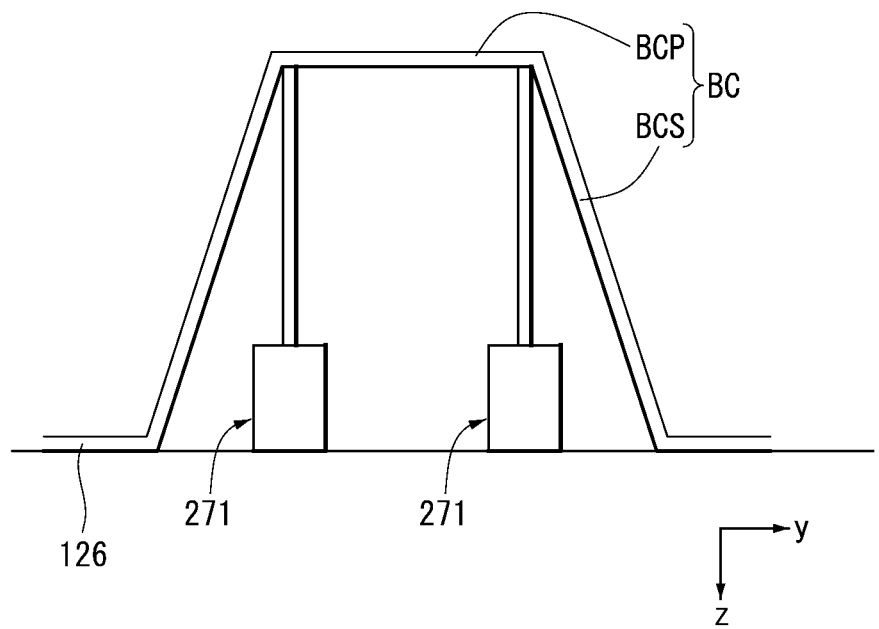

As shown in FIG. 35A, to form the chamfer flat area BCP, the chamfer area BC may be supported by at least two holders 271. For example, at least one holder 271 may support one edge which connects the chamfer flat area BCP to the chamfer inclination area BCS, and at least one other holder 271 may support the other edge which connects the chamfer flat area BCP to the chamfer inclination area BCS.

In this case, forces may be concentrated as the holders 271 are located on both edges of the chamfer flat area BCP. Accordingly, the chamfer area BC having the chamfer flat area BCP may be formed even with a small amount of force.

Figure 35B:
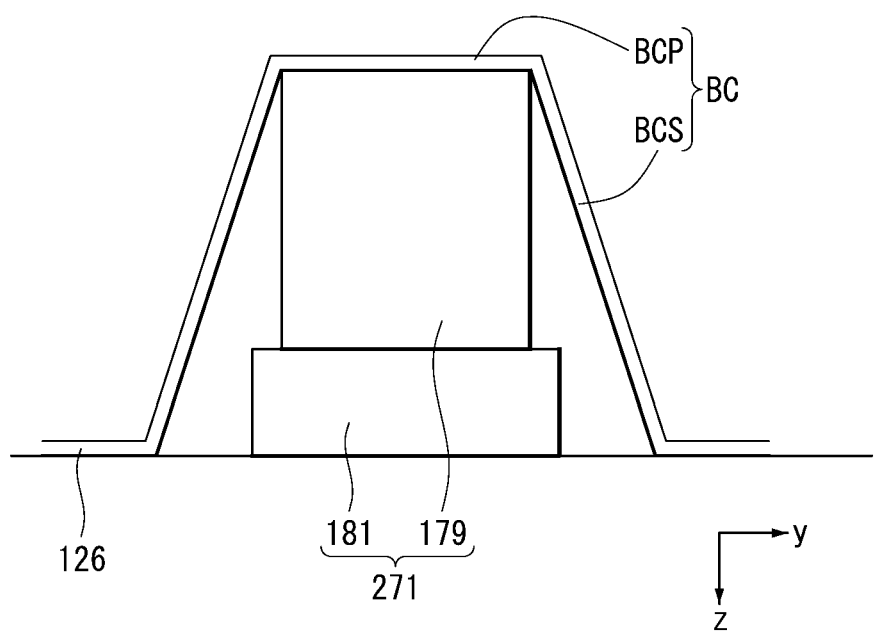

As shown in FIG. 35B, to form the chamfer flat area BCP, a holder 271 having a pin 179 that extends in the X-direction may support the chamfer area BC. The pin of the holder 271 may extend in the X-direction by the width of the chamfer flat area BCP. In this case, since the holder 271 supports the full width of the chamfer flat area BCP in the X-direction, support for the chamfer flat area BCP may be improved so that it does not fall down.

As described with reference to FIGS. 35A and 35B, although the chamfer flat area BCP may be formed by using a holder 271, the present disclosure is not limited to the description above, and the chamfer flat area BCP may be formed by forming a flat area in the bending area FC of the frame 130 as previously discussed with reference to FIG. 21.

Figure 36:
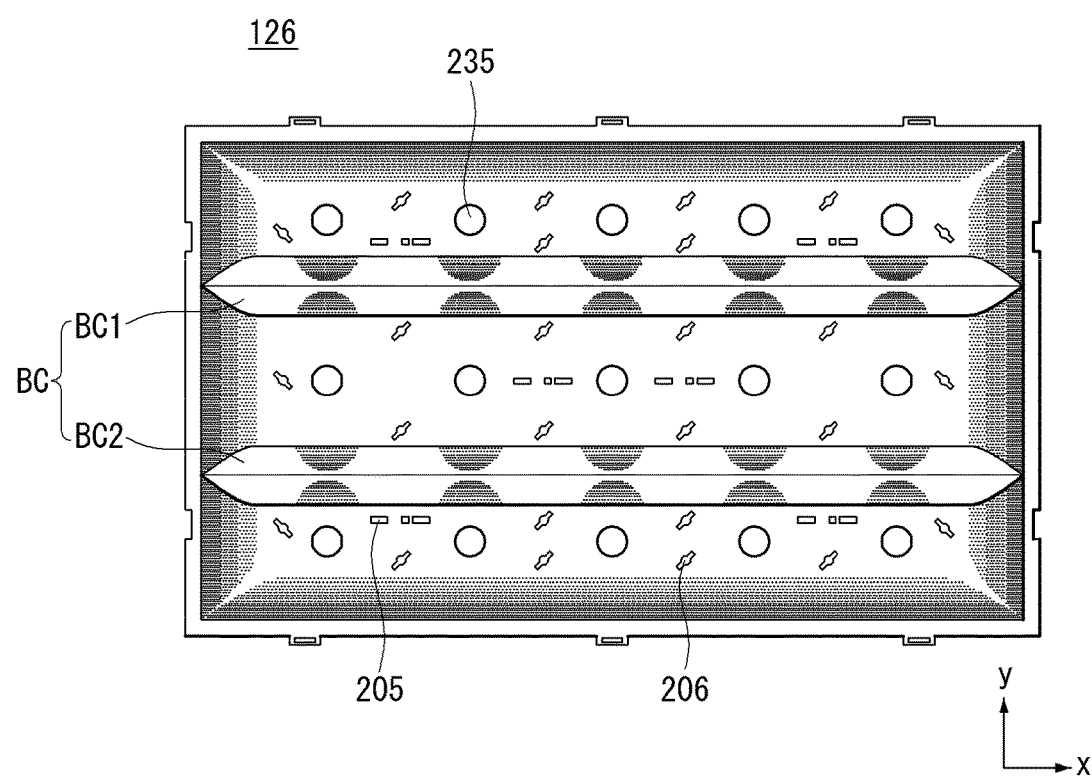
FIGS. 36 and 37 illustrate arrangement of fixing pinholes of a reflecting sheet according to another embodiment of the present disclosure.
Figure 37:
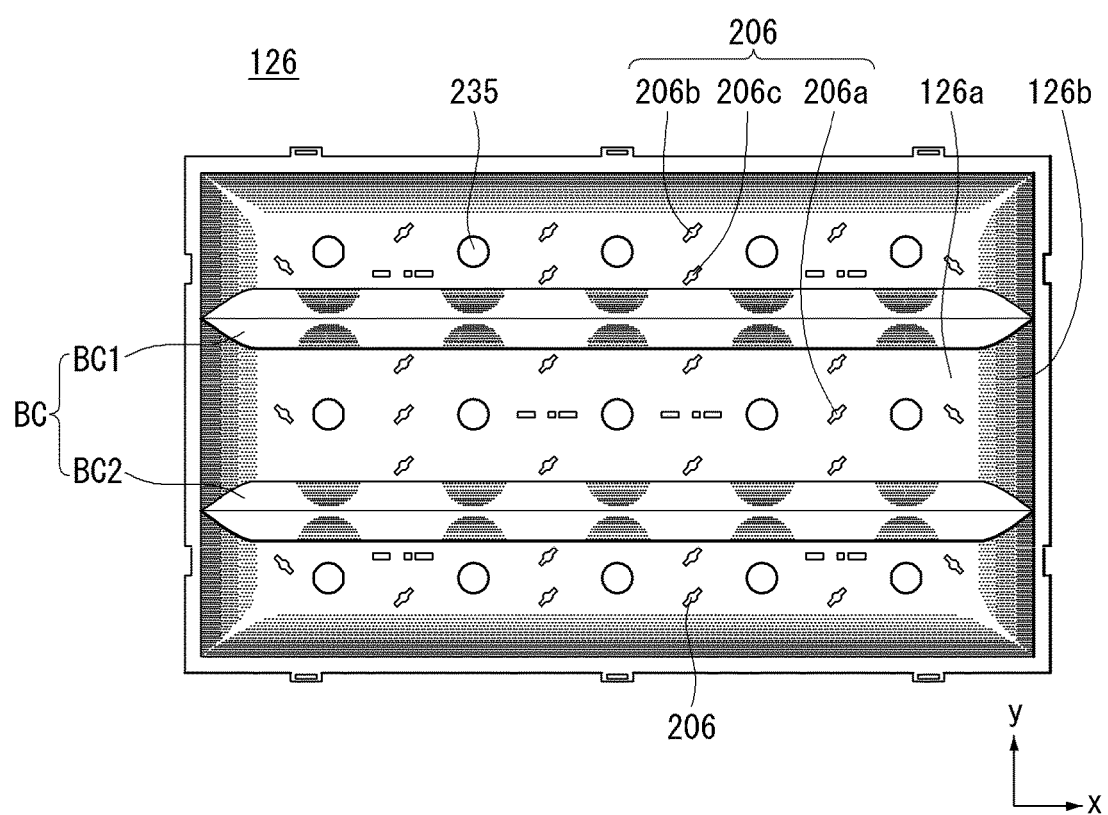

FIGS. 36 and 37 illustrate arrangement of fixing pinholes of a reflecting sheet according to another embodiment of the present disclosure. With reference to FIG. 36, the fixing pinhole 206 may be disposed along the boundary of the chamfer area BC of the reflecting sheet 126. The fixing pinhole 206 may be disposed along a line extended in the Y-direction as shown.

If the fixing pin 202 (FIG. 10) is coupled to the frame 130 through the fixing pinhole 206 in the boundary between the chamfer area BC and another region of the reflecting sheet 126, the chamfer area BC may be formed. In other words, if the fixing pin 202 is coupled to the frame 130 through the fixing pinhole 206 in the boundary between the chamfer area BC and another region, the chamfer area BC may be formed in the reflecting sheet 126 together with the holder 271 (FIG. 19) located inside the chamfer area BC.

The fixing pinhole 206 may not be formed over the whole area and may not be located at the part corresponding to the supporter hole 205. Even if the fixing pinhole 206 is not located at a location corresponding to the supporter hole 205, only the other fixing pin 202 may be sufficient to form the chamfer area BC in the reflecting sheet 126.

In the display device according to one embodiment of the present disclosure, the fixing pinhole 206 may be disposed in the boundary between the chamfer area BC and another region of the reflecting sheet 126. Accordingly, the chamfer area BC may be formed easily, and the chamfer area BC may kept in a flat state together with the holder 271.

With reference to FIG. 37, the fixing pinhole 206 may include a first fixing pinhole 206*a* located on the first sheet area 126*a*, a second fixing pinhole 206*b* located at the boundary between the second sheet area 126*b* and the first sheet area 126*a*, and a third fixing pinhole 206*c* located at the boundary between the chamfer area BC and the first sheet area 126*a*.

The first fixing pinhole 206*a* may be located between at least one lens hole 235 and a neighboring lens hole 235. The fixing pin 202 (FIG. 10) may combine the first sheet area 126*a* to the frame 130 through the first fixing pinhole 206*a*. In other words, the fixing pin 202 may attach the first sheet area 126*a* tightly to the frame 130 through the first fixing pinhole 206*a*.

Although the present figure assumes that the first fixing pinhole 206*a* is located in the central part of the first sheet area 126*a*, the present disclosure is not limited thereto, and the first fixing pinhole 206a may be located anywhere other than the boundary between the first sheet area 126a and another part.

The third fixing pinhole 206c may be located at the part not corresponding to the chamfer dot area BDA. In other words, the third fixing pinhole 206c may be located in the boundary between the first sheet area 126a in which the chamfer dot area BDA is not located and the chamfer area BC.

In the display device according to one embodiment of the present disclosure, the fixing pinhole 206 may be located not only in the boundary between the first sheet area 126a and another region, but also within the first sheet area. Accordingly, the reflecting sheet 126 may be attached more firmly to the frame 130.

An object of the present disclosure is to solve the aforementioned technical problem and other problems. One object of the present disclosure is to provide a backlight unit that provides a display device in which a chamfer region is located between light sources, and a display device including the backlight unit.

According to one aspect of the present disclosure, a backlight unit may be provided. The backlight unit may include a frame including a bottom area and a sidewall area extended from the bottom area, at least one substrate located on the front surface of the frame and on which a plurality of light sources are installed, a reflecting sheet located on the front surface of the at least one substrate, and an optical sheet located on the front surface of the reflecting sheet. The reflecting sheet may include a first sheet region in which a plurality of lens holes are disposed, a second sheet region extending to the outside of the first sheet region and having dots formed in at least one region of the second sheet region, and a third sheet region in which at least part of the inside of the reflecting sheet is located being protruding toward the front direction from the first sheet region and dots are formed in at least part of the protruding region.

The backlight unit may further include a holder which is located between the third sheet region and the frame and supports the reflecting sheet so that the third sheet region is included with respect to the first sheet region. In one embodiment, the frame may include a bending region, in at least part of which unevenness is formed so that the third sheet region forms an inclined surface with respect to the first sheet region.

At least one part of the third region may extend along the long side of the reflecting sheet. In one embodiment, at least one part of the third sheet region may extend along the short side of the reflecting sheet. The third sheet region may be formed as two surfaces inclined with respect to the bottom area come into contact with each other. The third sheet region may include a first chamfer inclination region inclined in a first direction with respect to the bottom area, a second chamfer inclination region inclined in a second direction with respect to the bottom area, and a chamfer flat region connecting the first and the second chamfer inclination region. Moreover, the backlight unit may include at least one holder located between the third sheet region and the frame and supporting the boundary between the chamfer flat region and the chamfer inclination region. The dot region may be separated from the chamfer flat region by a predetermined distance.

The angle between one surface of the third sheet region and the bottom area may be larger than the angle between the second sheet region and the bottom area. Moreover, the height of the third sheet region may be lower than the height of the second sheet region. In one embodiment, at least one of the dots formed on the third sheet region may have different attributes from at least one of dots formed on the second sheet region. The attribute may be at least one of size of the dot, color of the dot, density of the dot, and spacing of the dot.

The third sheet region may include a plurality of dot regions separated from each other, and dots belonging to at least one dot region among the plurality of dot regions may have different attributes from dots belonging to another dot region among the plurality of dot regions.

Dots of the third sheet region may be distributed over a first dot region adjacent to the bottom area and a second dot region adjacent to an edge along which two surfaces inclined with respect to the bottom area meet, and size of dots belonging to the first dot region may be smaller than the size of dots belonging to the second dot region. Dots of the third sheet region may be separated from the boundary of the bottom area by a predetermine distance.

According to another aspect of the present disclosure, a display device may be provided that includes a frame including a bottom area and a sidewall area extended from the bottom area, at least one substrate on which a plurality of light sources are installed, a reflecting sheet located on the front surface of the at least one substrate, an optical sheet located on the front surface of the reflecting sheet, and a display panel located on the front surface of the optical sheet. The reflecting sheet may include a first sheet region in which a plurality of lens holes are disposed, a second sheet region extending to the outside of the first sheet region and having dots formed in at least one region of the second sheet region, and a third sheet region in which at least part of the inside of the reflecting sheet is located being protruding toward the front direction from the first sheet region and dots are formed in at least part of the protruding region.

The display device may further include a holder which is located between the third sheet region and the frame and supports the reflecting sheet so that the third sheet region forms an inclination with respect to the first sheet region. At least one part of the third region may extend along at least one of a long side of the reflecting sheet and a short side of the reflecting sheet. The third sheet region may include a plurality of dot regions separated from each other, and dots belonging to at least one dot region among the plurality of dot regions may have different attributes from dots belonging to another dot region among the plurality of dot regions.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit, comprising:
 a frame having a recess formed on a front surface of the frame, the recess having a bottom area and a sidewall area that extends from the bottom area;
 at least one substrate provided over the front surface of the frame, a plurality of light sources being installed over the at least one substrate;
 a reflecting sheet provided over a front surface of the at least one substrate; and
 an optical sheet provided over a front surface of the reflecting sheet,
 wherein the reflecting sheet includes
  a first sheet region having a plurality of lens holes that correspond to the plurality of light sources installed on the at least one substrate,
  a second sheet region that extends outward from the first sheet region and provided to surround the first sheet region, the second sheet region being inclined relative to the first sheet region, and
  a third sheet region provided in the first sheet region, the third sheet region having a protrusion that protrudes from the first sheet region toward a front side of the backlight unit,
 wherein the reflecting sheet includes a plurality of patterns provided on the second sheet region and the third sheet region configured to reduce reflectivity of light emitted from the plurality of light sources, and
 wherein a plurality of structures having a dot shape are arranged to form the plurality of patterns on the third sheet region and the second sheet region, wherein at least one dot formed on the third sheet region has different attributes from at least one of dot formed on the second sheet region such that a reflectivity of a pattern on the third sheet region is different than a reflectivity of a pattern on the second sheet region.

2. The backlight unit of claim 1, further comprising a holder provided between the third sheet region of the reflecting sheet and the frame, wherein the holder protrudes from the bottom area of the frame toward the front side of the backlight unit to support the reflecting sheet such that the third sheet region protrudes from the first sheet region.

3. The backlight unit of claim 1, wherein the frame has a bent portion at the bottom area, the bent portion protruding toward the front side of the backlight unit to support the reflecting sheet such that the third sheet region protrudes from the first sheet region.

4. The backlight unit of claim 1, wherein the third region extends parallel to a long side of the reflecting sheet.

5. The backlight unit of claim 1, wherein the third sheet region extends parallel to a short side of the reflecting sheet.

6. The backlight unit of claim 1, wherein the third sheet region protrudes relative to the first sheet region to have two inclined surfaces angled toward each other.

7. The backlight unit of claim 1, wherein the protrusion of the third sheet region includes a first side surface inclined in a first direction with respect to the bottom area, a second side surface inclined in a second direction with respect to the bottom area, and a flat surface that connects the first and the second side surfaces.

8. The backlight unit of claim 7, further comprising at least one holder provided between the third sheet region of the reflecting sheet and the frame to support a boundary between the flat surface and the first side surface or the second side surface of the protrusion.

9. The backlight unit of claim 7, wherein the plurality of patterns on the third sheet region are formed by a plurality of dots having a prescribed shape, size, color, and spacing relative to each other, the dots being disposed on the protrusion to be separated from the flat surface by a predetermined distance.

10. The backlight unit of claim 1, wherein an angle of incline of the protrusion of the third sheet region is greater than an angle of incline of the second sheet region relative to the bottom area of the frame.

11. The backlight unit of claim 1, wherein a height of the third sheet region is lower than a height of the second sheet region.

12. The backlight unit of claim 1, wherein the attribute is at least one of a size of the dots, a color of the dots, a density of the dots, or a spacing of the dots that form the patterns.

13. The backlight unit of claim 1, wherein the third sheet region includes a plurality of dot regions having dots that form the patterns, the plurality of dot regions being disposed to be separated from each other, and dots in at least one dot region among the plurality of dot regions have different attributes from dots in another dot region among the plurality of dot regions.

14. The backlight unit of claim 1, wherein dots form the plurality of patterns of the third sheet region, the dots being distributed over a first dot region adjacent to the bottom area and a second dot region at an upper portion of the protrusion on the third sheet region, and a size of dots in the first dot region being smaller than a size of dots in the second dot region.

15. The backlight unit of claim 1, wherein dots form the plurality of patterns of the third sheet region, the dots being disposed to be separated from a boundary between the protrusion and the bottom area by a predetermine distance.

16. A display device, comprising:
 a frame including a bottom area and a sidewall area that extends from the bottom area;
 at least one substrate provided on the frame, a plurality of light sources being installed over the at least one substrate;
 a reflecting sheet provided over a front surface of the at least one substrate;
 an optical sheet provided over a front surface of the reflecting sheet; and
 a display panel provided over a front surface of the optical sheet,
 wherein the reflecting sheet includes
  a first sheet region having a plurality of lens holes that correspond to the plurality of light sources installed on the at least one substrate,
  a second sheet region that extends outward from the first sheet region and provided to surround the first region, and
  a third sheet region provided in the first sheet region, the third sheet region having a protrusion that protrudes from the first sheet region toward the optical sheet,
 wherein the reflecting sheet includes a plurality of patterns provided on the second sheet region and the third sheet region configured to reduce reflectivity of light emitted from the plurality of light sources, and
 wherein a plurality of structures having a dot shape are arranged to form the plurality of patterns on the third sheet region and the second sheet region, wherein at least one dot formed on the third sheet region has different attributes from at least one of dot formed on the second sheet region such that a reflectivity of a pattern on the third sheet region is different than a reflectivity of a pattern on the second sheet region.

17. The display device of claim 16, further comprising a holder provided between the third sheet region of the reflecting sheet and the frame, wherein the holder protrudes from the bottom area of the frame to support the reflecting sheet to form the protrusion on the third sheet region with respect to the first sheet region.

18. The display device of claim 16, wherein the protrusion of the third region extends parallel to at least one of a long side of the reflecting sheet or a short side of the reflecting sheet.

\* \* \* \* \*